(12) United States Patent
Dorner

(10) Patent No.: US 11,176,484 B1
(45) Date of Patent: Nov. 16, 2021

(54) ARTIFICIAL INTELLIGENCE SYSTEM FOR MODELING EMOTIONS ELICITED BY VIDEOS

(71) Applicant: Amazon Technologies, Inc., Seattle, WA (US)

(72) Inventor: Charles Shearer Dorner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1072 days.

(21) Appl. No.: 15/695,829

(22) Filed: Sep. 5, 2017

(51) Int. Cl.
| | |
|---|---|
| *G06N 3/04* | (2006.01) |
| *G06F 3/01* | (2006.01) |
| *G06K 9/00* | (2006.01) |
| *G06N 20/00* | (2019.01) |
| *G06F 16/738* | (2019.01) |
| *G06F 16/78* | (2019.01) |

(52) U.S. Cl.
CPC .......... *G06N 20/00* (2019.01); *G06F 16/738* (2019.01); *G06F 16/7867* (2019.01)

(58) Field of Classification Search
CPC .... G06N 20/00; G06F 16/738; G06F 16/7867
USPC ...................................................... 706/1–62
See application file for complete search history.

(56) References Cited

U.S. PATENT DOCUMENTS

| | | | |
|---|---|---|---|
| 2009/0293079 A1 | 11/2009 | McKee | |
| 2014/0222775 A1 | 8/2014 | Zohar | |
| 2016/0378861 A1* | 12/2016 | Eledath | G06K 9/00718 |
| | | | 707/766 |
| 2017/0006252 A1 | 1/2017 | Patel | |
| 2017/0330029 A1* | 11/2017 | Turcot | G06K 9/00308 |
| 2018/0158093 A1* | 6/2018 | Szirtes | G06Q 30/0269 |
| 2018/0198748 A1 | 7/2018 | Bastide | |
| 2019/0297304 A1* | 9/2019 | Li | G06F 3/013 |
| 2020/0104670 A1* | 4/2020 | Seo | G06F 40/30 |

OTHER PUBLICATIONS

Chen, X et al., "Personalized Key Frame Recommendation," SIGR '17 (Aug. 2017) pp. 315-324.
Li, X et al., "Bootstrapping Social Emotion Classification with Semantically Rich Hybrid Neural Networks," IEEE Trans. on Affective Computing, vol. 8, No. 4, (2017) pp. 428-442.
Tao, X et al., "Real-time personalized content catering via viewer sentiment feedback: a QoE perspective," IEEE Network, (2015) pp. 14-19.
Tsukuda, K et al., "SmartVideoRanking: Video Search Mining Emotions from Time-Synchronized Comments," 2016 IEEE 16th Intl. Conf. on Data Mining Workshops (2016), pp. 690-969.

(Continued)

*Primary Examiner* — Brandon S Cole
(74) *Attorney, Agent, or Firm* — Knobbe, Martens, Olson & Bear, LLP

(57) ABSTRACT

A machine learning system builds and uses computer models for identifying or predicting intensity of emotional reactions elicited by a particular video. Such computer models may also determine which particular emotional reaction corresponds to certain times during the video, and whether these reactions are positive or negative for a particular user. The computer models can also predict emotional reactions likely to be elicited by new videos based on learned correlations between video features and elicited emotional reactions.

20 Claims, 9 Drawing Sheets

(56) References Cited

OTHER PUBLICATIONS

UFDL Deep Learning Tutorial, online as of Feb. 2017, <<web.archive.org/web/20170214141305/http://ufldl.Stanford.edu/tutorial>>.
Xu, M et al., "Hierarchical Movie Affective Analysis Based on Arousal and Valence Features," Proc. of the $16^{th}$ ACM Intl. Conf. on Multimedia (Oct. 2008), pp. 677-680.

* cited by examiner

US 11,176,484 B1

ARTIFICIAL INTELLIGENCE SYSTEM FOR MODELING EMOTIONS ELICITED BY VIDEOS

BACKGROUND

Generally described, computing devices and communication networks can be utilized to exchange content and other information. In a common application, a server computing system can provide content to various client computing devices. The content may be textual content, image-based content, videos, animations, some combination thereof, etc. For example, a server computing system can host or provide access to videos that are viewable by client computing devices. A client computing device can transmit a request for a video to the server computing system, and in response the server computing system can transmit or "stream" the requested video to the client computing device. The client computing device can display the video and respond to various playback commands (e.g., pause, rewind, etc.).

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
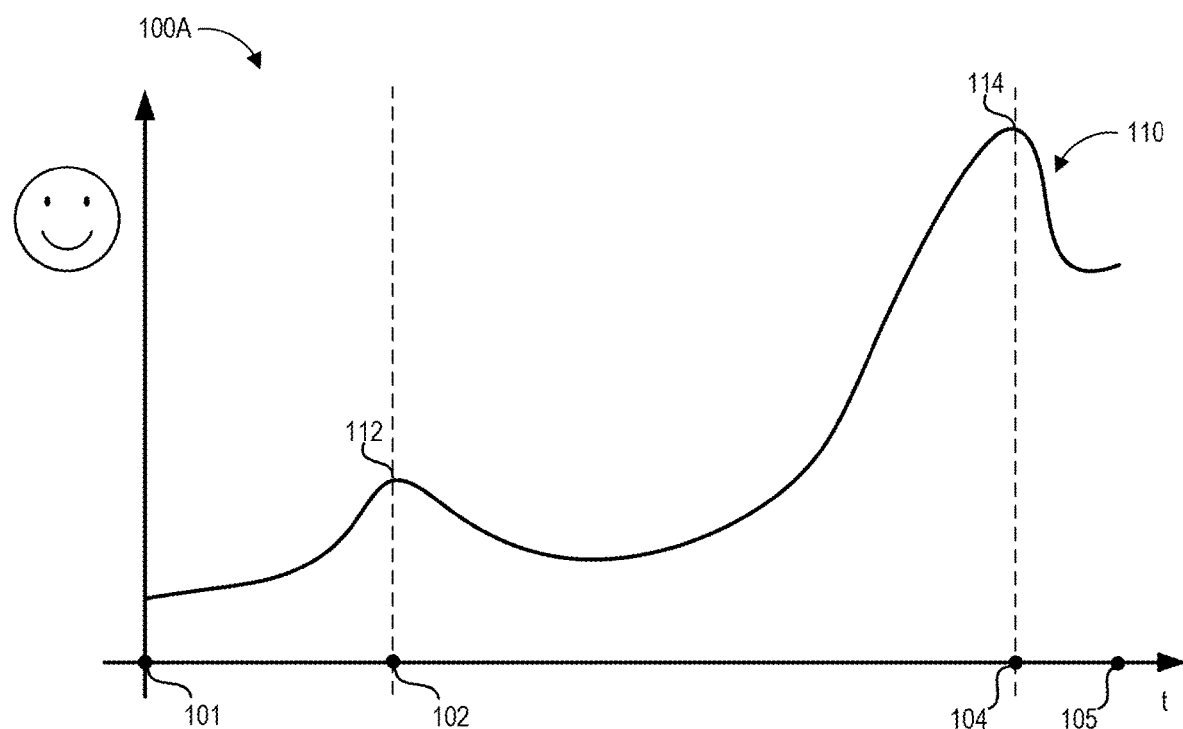
FIGS. 1A and 1B depict example reaction timelines of a video.

The present disclosure is generally directed to using artificial intelligence or machine learning systems to build and use computer models for identifying or predicting intensity of emotional reactions elicited by a particular video. Such computer models may also determine which particular emotional reaction corresponds to certain times during the video, and whether these reactions are positive or negative for a particular user. Humans experience a wide range of different emotions ranging from simple or reactive (e.g., happiness, sadness, anger, fear, surprise) to complex or self-reflective (e.g., awkwardness, pride, guilt, embarrassment, nostalgia). The particular emotional reaction elicited by a given video can vary from viewer to viewer, and can also vary for a single viewer at different time points in the video or based on the mood of the user while viewing the video. Computer systems are commonly understood to not experience emotions themselves, and so using them to try to analyze and predict emotions requires extraction of meaningful patterns from gathered data.

One challenge in teaching computer systems to understand human emotions in video reactions is that labeled data is required for training prediction models. Labeled data, in the context of human emotional reactions to a video, can be a timeline of known emotional reactions provided to a video. Such data can be challenging to gather. To obtain such labeled data, some previous approaches have monitored viewers' faces via video observation, and then analyzed their facial expressions in the resulting videos to label their emotional reactions. However, due to privacy concerns and the intrusiveness of video monitoring, such approaches are limited to situations in which participants voluntarily submit to video monitoring for a duration of time in which they watch a particular video. As such, monitoring video viewers is not scalable to analyzing a corpus of a large quantity (e.g., millions) of videos and/or a dynamically changing selection of videos. Further, it has not been conclusively established that certain facial expressions are universal signals of specific emotions, particularly with respect to complex emotions.

Another problem with generating labeled data is that different users may have different reactions to a given section of video. Different reactions can include different emotional reactions and/or varying intensities of emotional reactions. For example, an adult might find a video of a puppet ghost funny, but a child may experience the same video as scary. Similarly, while two people may both enjoy watching scary movies, one person may want to re-watch a very scary portion for fun while the other may opt to skip over that same portion due to finding it to be too scary.

The aforementioned problems, among others, are addressed in some embodiments by the disclosed machine learning and artificial intelligence systems for modeling human emotional reactions to video content. The data leveraged by the disclosed machine learning models can include non-intrusive signals of emotional reactions, for example user selection of thumbs up or thumbs down options for a video, user insertion of certain emoticons (or other emotional indication graphics) on a video timeline, user comments on the video or to other users about the video, user selection of skip or replay playback commands at certain timecodes of a video, and the like. Beneficially, such systems are able to model the intensity of emotion elicited by video and the specific emotion elicited at various timecodes of the video using such non-intrusively collected signals. The machine learning system can generate multiple timelines for a specific video, with each timeline showing a different categorized user emotional reaction and optionally intensity of the reaction. In some embodiments, these may be overlaid graphically and presented to a user, for example with different representations of the different timelines, in order to convey an emotional reaction profile of the video. Such information may be useful for video creation and editing, and may be presented as real time feedback, for example to a live streamer.

Some systems can also use known attributes of a user to predict how the determined emotional reactions at the determined intensities, alone or in sequence, may be experienced along a spectrum of positive to negative by the user. These predictions can be leveraged to recommend videos to the user that he or she is likely to find enjoyable. In some embodiments, the user attributes can include signals of emotional reactions to content the user is viewing, and the machine learning system can analyze these in real time to direct the user to recommended content. Beneficially, using real time analysis of provided emotional reactions enables the machine learning system to provide recommendations that suit the user's current mood. Real time can refer to the time frame in which a user is still viewing a video to which the user provided a reaction that was analyzed, or during a time frame spanning a current content viewing session of a user.

Figure 1B:
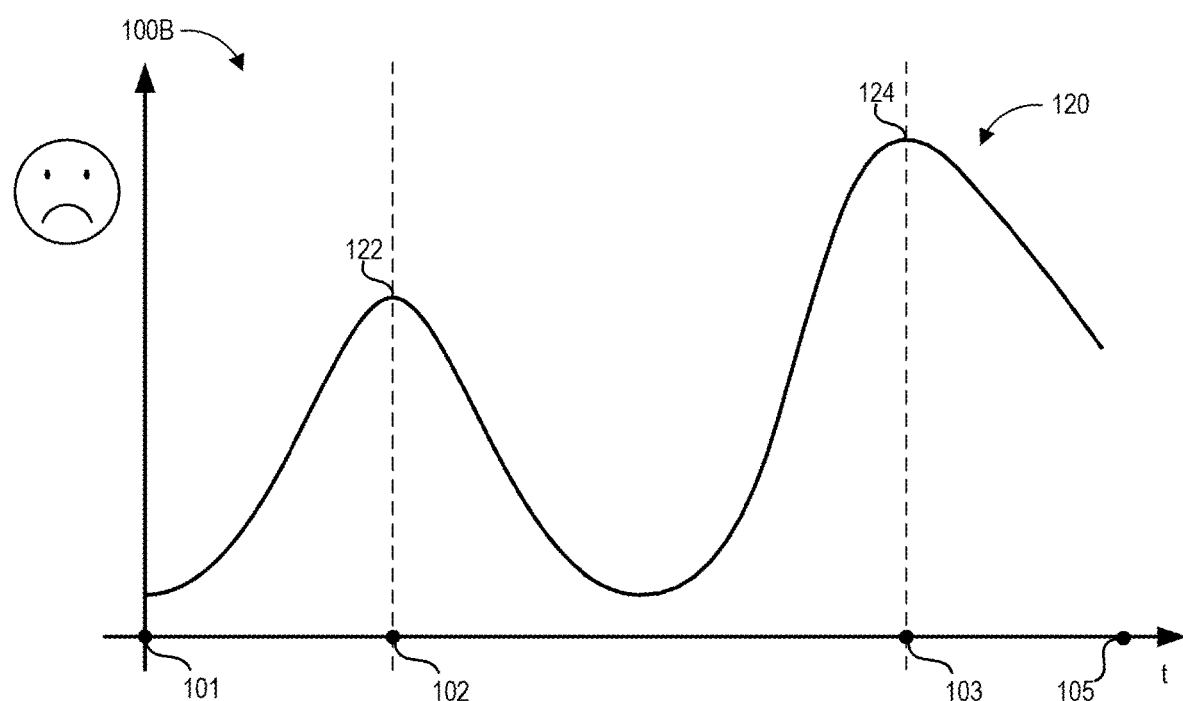

To illustrate, consider the example timelines depicted by FIGS. 1A and 1B for an example video. FIG. 1A depicts an example happy emotional reaction timeline 100A and FIG. 1B depicts an example sad emotional reaction timeline 100B. Such timelines represent illustrative distributions of intensity (e.g., number and/or strength) of happy and sad emotional reactions, respectively, at different time points during the video. The time at which viewers begin watching the video is shown as time 101 on both timelines 100A, 100B. This time may be the point from which subsequent times are computed (e.g., amounts of time elapsed since time 101). Particular scenes of the movie occurs at times 102, 103, and 104, and the end of the movie occurs at time 105.

A distribution 110 of happy reactions to the video, provided by viewers who watched the video, is shown such that the occurrence of individual events represented on the distribution curve correspond to points on the timeline 100A. These points can correspond to timecodes within the video. As shown, the distribution 110 includes a first peak 112 at time point 102 and a second peak 114 at time point 104, with the second peak 114 having a greater intensity than the first peak 112. This can reflect a greater number of user reactions at time point 104 than time point 102, a greater strength of user reactions at time point 104 than time point 102, or a combination of number and strength. For example, users can submit emoticons at time point 102 indicating a moderate level of happiness, and can submit emoticons reflective of stronger happy feelings at time point 104. As another example, users can submit comments at time point 102 indicating a moderate level of happiness (e.g., "what a sweet moment", "this is great") and can submit comments reflective of stronger happy feelings at time point 104 (e.g., "best ending!!!", "SO happy"). Thus, the text-based comments can be analyzed both for language, punctuation, and formatting (e.g., use of capitals or lower case, font size) in order to mine cues of emotional reaction strength. The text mining can account for language habits of particular users (e.g., some users always use capitals, while for others capitals indicate stronger emotion). In another example, users may re-watch the scene at time point 104 more times or more frequently than they re-watch the scene at time point 102.

Similarly, a distribution 120 of sad reactions to the video is shown such that the occurrence of individual events represented on the distribution curve correspond to points on the timeline 100B and timecodes of the video. As shown, the distribution 110 includes a first peak 122 at time point 102 and a second peak 124 at time point 103, with the second peak 114 having a greater intensity than the first peak 112. The first peak 122 on the sad emotional reaction distribution 120 occurs at the same time point 102 as the first peak 112 on the happy emotional reaction distribution 110. This discrepancy can be used to identify attributes of the viewers who provided such reactions, for example indicating that a first type of viewer enjoys the scene at time point 102 and a second type of user does not enjoy the scene at time point 102. Further, as illustrated, the first peak 122 on the sad emotional reaction distribution 120 has a greater intensity than the first peak 112 on the happy emotional reaction distribution 110. This can indicate that, although the scene at time point 102 elicits mixed reactions, a given reaction is more likely to be sad than happy, and that the scene is more likely a sad scene than a happy scene. This may also or alternatively indicate that the scene at time point 102 elicits more complex emotional reactions, such as bittersweet emotion (e.g., a mixture of happiness and sadness), and that the scene is thus a bittersweet scene. Thus, in some embodiments significant occurrences of multiple categories of emotional reaction at a timecode can be used to determine that a scene elicits a complex emotion that is a mixture of the provided reactions.

In combination, the distributions 110, 120 can be considered as a plot tension timeline of the video, with the plot tension timeline indicative of a level or type of plot tension of the video. This plot tension timeline can be used to categorize the video, to qualitatively rate or rank the video (e.g., in comparison to desired plot tension timelines for particular types of videos), and to determine any users to which the video should be recommended. For example, the latest peak on the timeline corresponds to a happy emotional reaction, which can indicate that the video has a happy resolution or ending. As another example, the video includes two strong sad emotional peaks, which can indicate that the video has a dramatic nature. As another example, the two highest peaks are peak 124 on the sad emotional reaction distribution 120 at time point 103 closely followed by peak 114 on the happy emotional reaction distribution 110 at time point 104, which can indicate that the plot tension of the video peaks with a happy resolution to a dramatic ending. As another example, the peaks on both distributions 110, 120 increase over the course of the video, which can be an indicator of the video following a suitable plot tension timeline (e.g., with plot tension increasing until the final scene). Various plot tension timelines, for example having increasing peaks, having decreasing peaks, or having peak intensities that follow a particular linear or polynomial equation, can be desirable for different types of videos. Such plot tension timelines can be output as feedback during "storyboarding" for movie production teams to gauge the quality of the movie plot, or may be used to identify users who may be interested in viewing a video of that particular plot tension timeline (e.g., based on historical reactions provided by the users).

The disclosed machine learning systems can also learn which features of video content (e.g., objects in the video frames, sounds in the soundtrack, keywords in the dialogue, phrases in the dialogue, or patterns in the dialogue), alone or in sequence, are associated with different types of emotional reactions. For example, the machine learning system can learn that a ghost in the video frames is typically associated with an emotional reaction of fear, or that the words "I love you" in the dialogue are typically associated with an emotional reaction of love. The machine learning system can also learn more complicated relationships between multiple features occurring together and/or in sequence and the resulting emotional reactions. For example, the machine learning system can learn that a couple embracing in video frames typically elicits a happy emotional reaction when there is a soundtrack song playing in a major key, but that a couple embracing in combination with a minor key soundtrack song typically elicits a sad emotional reaction. As another example, the machine learning system can learn that a scene of one character on an airplane followed by a scene with that character embracing another typically elicits a happy emotional reaction, but that a scene with two characters embracing followed by a scene of one of the characters on an airplane typically elicits a sad emotional reaction. The machine learning system can also learn relationships between features and resulting reactions for specific user segments.

These learned associations between video features and resulting reactions can be used to predict emotional reactions based on identified features in new videos or existing videos with little or no associated viewer reaction feedback. For example, a machine learning system can include one or more machine learning models for identifying visual and/or audio features—alone, in combination with one another, and in particular sequences—and these identified features can be input into another machine learning model trained to identify relationships between video features and elicited emotional reactions. This machine learning model can output one or more predicted emotional reaction timelines, for example by having a number of models each trained to predict a timeline of reactions of a different category.

These learned associations between video features and resulting reactions can also be used by an artificial intelligence system in combination with the above-described learning of plot tension timelines to enable automated generation of movie storyboards that will likely elicit a particular pattern of emotional reactions. These storyboards can include a certain ordering of scenes, with each scene including visual features (e.g., characters, scenery, foreground/ background objects, and/or other objects) and audio features (e.g., dialogue, sound effects, and/or music). In some embodiments, the artificial intelligence system can use the generated storyboard in combination with a computer-generated graphics system (e.g., a system capable of rendering still and moving objects) and an audio synthesizing system (e.g., a system that can simulate human speech, sound effects, and music) in order to create an automatically-generated movie. This movie generation process can be entirely automated by the artificial intelligence system, or can involve output of various stages of the movie generation process to a user interface for user review and/or modification.

Although shown in the example context of happy and sad timelines, such timelines can be generated to express just intensity of generally any emotional reaction or to express intensities of any desired category of emotional reaction. A category of emotion refers to either a specific emotion (e.g., surprise, happiness, fear) or a grouping of similar emotions (e.g., happy can encompass joy, elation, cheer, and merriment). The level of granularity of categories may be dependent upon the signals leveraged from user behavior to identify emotional reactions, for example based on emotional reaction options presented to users (e.g., a set of emoticons, thumbs up or thumbs down icons) and on whether text-based user comments are mined for signals of emotional reactions (e.g., keywords and/or phrases expressing emotions). Further, although the timelines 100A, 100B are described as reflective of provided viewer reactions for the video, it will be appreciated that a machine learning model trained using such timelines can predict similar timelines for other videos having little or no associated viewer reaction feedback. Emotional reaction timelines can have varying numbers of peaks, and may be represented as volume of reactions per scene or per predetermined time period rather than as a continuous curve. Further, some emotional reaction timelines can have flat regions, for example along the t axis in the illustrated timelines 100A and 100B, which would indicate that no emotional reaction occurred at such times.

The foregoing are provided as just a few non-limiting examples to introduce the disclosed machine learning and artificial intelligence systems by illustrating simple timelines that could be generated by such a system. The disclosed machine learning systems can include one or more electronic memories storing specific computer-readable instructions that, when executed by one or more hardware processors, perform the disclosed learning and prediction functions. The disclosed artificial intelligence systems can include one or more electronic memories storing specific computer-readable instructions that, when executed by one or more hardware processors, perform the disclosed functions that mimic human understanding of emotion. Further examples and system features are described in more detail below.

As will be appreciated, reactions that are "negative" or "positive" can vary from user to user, and can also vary from time to time for each user. For example, some users may consider awkward content to be enjoyable and funny, while other users may find awkward content difficult or unpleasant to watch. For the former, an "awkward" reaction may indicate positive sentiment while for the latter, an "awkward" reaction may indicate negative sentiment. To address this potential ambiguity, embodiments of the disclosed machine learning and artificial intelligence systems can generate and/or store individual or user-segment level profiles. Each user profile can associate particular reactions provided by the user or user segment with positive or negative sentiment indications (e.g., binary positive/negative, positive/negative/neutral, or values along a spectrum of positive to negative), and the system can use such profiles to classify a particular reaction provided by a particular user as positive, negative, or somewhere in between. The features of the user profiles can be a type of user attributes for input into the disclosed prediction systems in some embodiments.

Further, for a given user, a reaction of "sad" may typically be considered as indicating negative sentiment, while after occurrence of a sad life event the user may desire to view sad content. Accordingly, embodiments of the machine learning and artificial intelligence systems can generate and/or store mood profiles. The features of the mood profiles can be a type of user attributes for input into the disclosed prediction systems in some embodiments. Each mood profile can relate to a different one of a number of moods, and can associate particular reactions with positive or negative sentiment indications for users experiencing that mood. The system can use user mood profiles in combination with real-time determinations of user moods based on provided user reactions in order to classify a particular reaction provided by a particular user as positive, negative, or somewhere in between. Mood profiles can also be used to output recommendations that fit the current emotional content preferences of the user.

Although aspects of some embodiments described in the disclosure will focus, for the purpose of illustration, on particular examples of output media content, items, and interactions, the examples are illustrative only and are not intended to be limiting. In some embodiments, the techniques described herein may be applied to additional or alternative content. For example, the analyzed content is discussed in the example of videos, but in other embodiments may be virtual or augmented reality content, image content (e.g., pictures, drawings, etc.), audio content (e.g., audio books, podcasts, music, etc.), textual content (e.g., electronic books or "e-books"), or the like. Various aspects of the disclosure will now be described with regard to certain examples and embodiments, which are intended to illustrate but not limit the disclosure.

In some embodiments the disclosed machine learning models can be trained offline and then used to provide recommendations or video feedback online. As used herein, "offline" or "offline mode" refers to processing operations relating to data and/or calculations that are pre-computed, that is, performed in advance of an event that may trigger output of a recommendation. For example, a machine learning model as described herein may be trained periodically, such as once per day, and then used by a recommendation engine to generate recommendations for users as they interact with the content delivery system. Some recommendations can be provided outside of the context of user interactions with the content delivery system, for example via targeted advertisements sent via electronic messages to users. As another example, a machine learning model as described herein may be trained periodically, such as once per day or once per month, and then used by a video creation or editing system to provide feedback on reactions predicted to be elicited by the video. As used herein, "online" or "online mode" refers to processing operations performed in response to an event that triggers output of a recommendation or of feedback. Online recommendations can be provided to users in "real time." For example, a recommendation provided in real time can be displayed to a user as the user is interacting with the content delivery system, such as while the user is viewing a video or other digital content item. Online feedback can also be provided to users in real time, such as while a user is performing for a live video stream.

Overview of Example Data Gathering and Machine Learning System

Figure 2A:
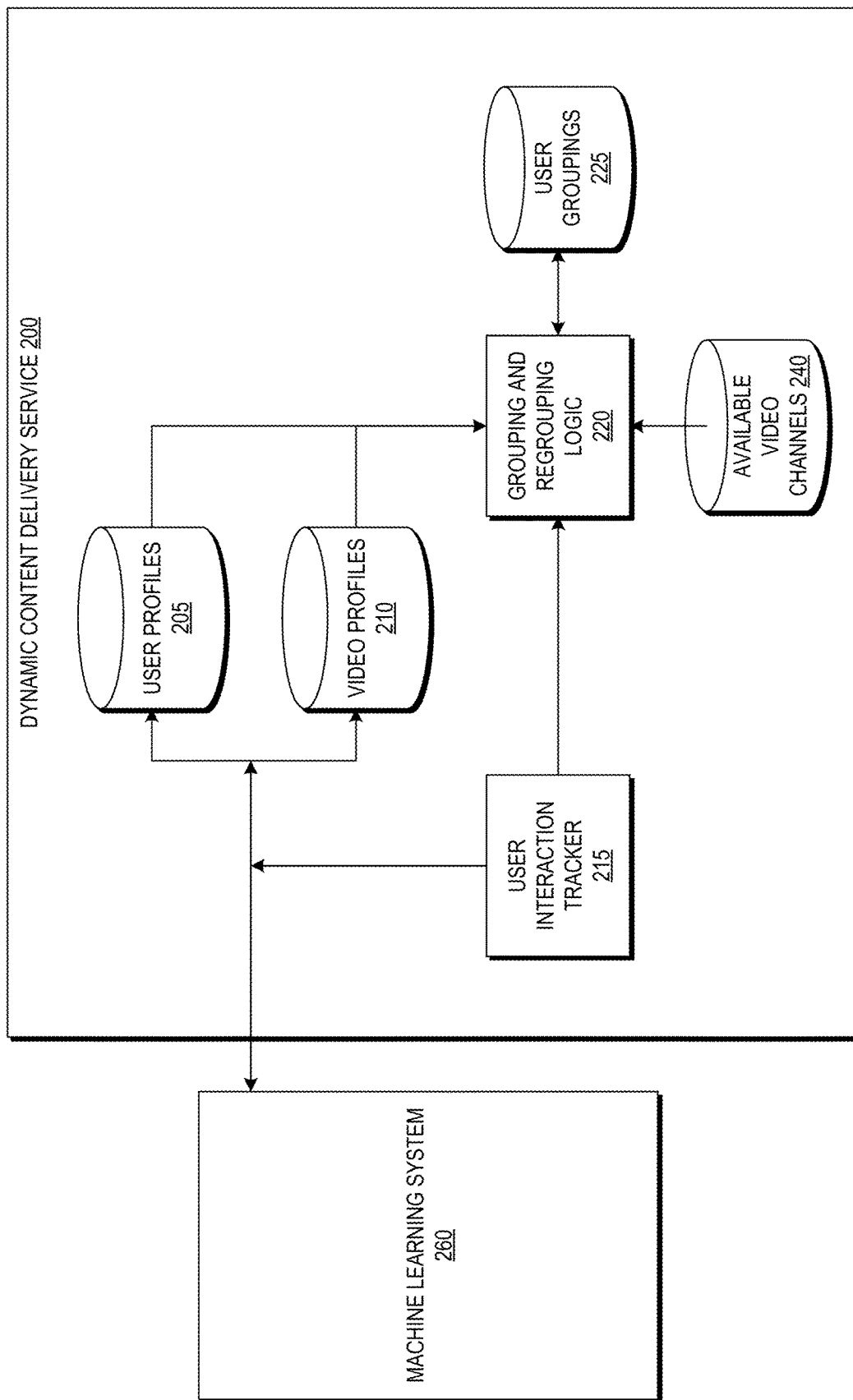
FIG. 2A is a schematic diagram of illustrative components and data flow between a machine learning system and a dynamic content delivery service according to some embodiments.

With reference to an illustrative embodiment, FIG. 2A shows a schematic diagram of illustrative components and data flow within a dynamic content delivery service 200 that can be used to provide labeled data for the disclosed machine learning system 260. The machine learning system 260 is configured to undergo training to identify or predict user emotional reactions to videos as described herein. The dynamic content delivery service 200 can be configured to quickly redirect users into new groups and/or to new videos based on provided user reactions. Accordingly, the service 200 can be configured to facilitate provision of user reactions through thumbs up or thumbs down icons, rating systems, user-selectable emoticon options for placement of emoticons on a video timeline, user discussion and messaging systems, and the other options described herein. The users can use the service 200 for entertainment and can elect to provide their reactions in order to curate a more enjoyable experience from the service 200, as described in more detail below. As such, the dynamic content delivery service 200 can non-intrusively generate large quantities of labeled data regarding user emotional reactions to a wide range of videos. Although the machine learning system 260 can use data from the dynamic content delivery service 200 as its labeled data for machine learning model training, the machine learning system 260 can additionally or alternatively obtain labeled data from other sources, for example from data repositories of manual and/or crowdsourced classification of emotional reactions at video timecodes.

The dynamic content delivery service 200 includes user profiles data repository 205, video profiles data repository 210, available video channels data repository 240, and user groupings data repository 225. These data repositories can each include one or more hardware electronic storage devices and one or more database architectures for storing the data described below. The dynamic content delivery service 200 also includes a number of modules including user interaction tracker 215, and grouping and regrouping logic 220. These modules can each include one or more programming modules executed by one or more processors.

The user profiles data repository 205 stores profiles of users, with such profiles including interaction history of the user, attributes of the user, and/or user segments to which the user is assigned. For example, the user profile data of a particular user can include a unique identifier of that user (e.g., a user ID number). The user profile data of that user can also include a sequential history of interactions performed by that user. Each interaction can include a code corresponding to a content viewing event (e.g., a serial number of a video or other content identifier), a time stamp of the time of the interaction, and additional data representing a reaction timeline of the user while viewing the content and/or keywords or textual responses submitted by the user. In some embodiments, user interactions with other systems (e.g., an electronic catalog system, social media systems, network browsing systems, and the like) can be included in the sequential history or in additional event histories that are stored in association with the user's unique identifier. The user profile data of that user can also include unique identifiers of attributes of that user, for example age band, gender, or other demographic information; preferences such as data indicating that the user doesn't like horror content, but likes awkward content; current and/or past moods of the user; and/or other information. The user profile data of that user can also include unique identifiers of any user segments to which the user has been assigned. User segments may include clusters of users that share common attributes and can be used for making general predictions about user preferences in the absence of, or supplementary to, specific interaction histories of a given user in the segment. As such, the user profiles data repository 205 can also include some or all of the above types of data stored in association with a unique user segment identifier.

The video profiles data repository 205 stores profiles of videos, with such profiles including interaction histories of users who have viewed a video, attributes of the video, and/or user categories to which the video is assigned. Videos can be pre-generated or live streams. For example, the video profile data of a particular video can include a unique identifier of that video (e.g., a serial number or video ID number). The video profile data of that video can also include a number of different reaction timelines logging reactions by different users to the video. Each timeline can include a unique identifier of the user, a code corresponding to a reaction (e.g., an identifier of a particular emoticon, comment, or other reaction provided by the user), and a time stamp of each reaction. Such reactions may be analyzed in aggregate to generate a more general aggregate reaction timeline representing average or typical user reactions to the different time points of the video. Attributes of videos can relate to the type of content in the video (e.g., cats, cooking, do-it-yourself instructions) and a number of attribute identifiers can be stored in association with each video. Example categories include horror, sci-fi, romantic comedy, live stream, gaming, instructional, and the like, and a given video can be assigned to one or more categories.

Though discussed in the context of videos, it will be appreciated that video profiles data repository 205 can be configured to store data representing other types of electronic content such as images, audio files, electronic books, and the like, depending upon the type of content served by the dynamic content delivery service 200.

User interaction tracker 215 may be configured to identify and log user interactions with content of the dynamic content delivery service 200. For example, user interaction tracker 215 can generate the reaction timelines described above based on logged reactions provided by users to certain videos. User interaction tracker 215 can also log which users watch which videos and for how long, and can log replays, skips, and other user-video interactions. Some embodiments of the user interaction tracker 215 can also be configured to analyze the tracked data to populate attributes into user and/or video profiles, to assign users to segments, to generate aggregate reaction timelines for videos, and/or to assign videos to categories.

User interaction tracker 215 can glean a lot about videos served via system 200, for example by mining text from user chat groups or messages and logging user reactions at certain timecodes. User interaction tracker 215 can correlate negative sentiment statements (e.g., a textual comment of "ugh, boring") with thumbs down reactions (or negative emoticons) that happen around those same times. User interaction tracker 215 can correlate positive sentiment statements (e.g., a textual comment of "I love this brand!") with thumbs up reactions that happen around those same times. This enables the system 200 to generate attributes for videos as well as timecodes associated with those attributes.

Available video channels data repository 240 stores identifiers of any pre-generated videos that are available for user viewing as well as any live streams that are currently being conducted. These videos and live streams can be grouped into a number of channels, for example based on videos in a channel sharing common attributes, categories, and/or aggregate user reaction timelines. Beneficially, creating channels of videos can enable the system to match a group of users with a particular channel and, once it is determined based on user reactions that the group and channel are a good fit, to easily redirect the group through a sequence of different videos likely to elicit positive reactions from users of the group.

User groupings data repository 225 is a dynamic data repository storing the current (and optionally past) groupings of users. These groupings can optionally be stored with identifiers of current (and optionally past) videos viewed by a particular group.

Grouping and regrouping logic 220 is configured to monitor the users currently using the system, the logged interactions of these users with current (and optionally past) videos and/or discussion groups, and the available video channels in data repository 240. Grouping and regrouping logic 220 is further configured to group users into groups with other users based on detected user and/or group video reactions, user and video profiles, and predetermined action rules. Grouping and regrouping logic 220 is further configured to assign a user group to a channel (or a specific video).

For example, when new users are joining (e.g., beginning a session with) the dynamic content delivery service 200, the grouping and regrouping logic 220 can determine how to group the new users with each other and/or existing groups. If users are joining at a rapid rate, the grouping and regrouping logic 220 can group them based on time (for example, all users who join within the same interval, e.g. one minute) or group size (e.g., the next 200 people). In one embodiment, the users in these groups all watch the same video content together, and are connected socially via a chat room, discussion board, or other type of messaging service.

Once users are watching a video, the grouping and regrouping logic 220 can begin a cycle of monitoring user reactions for triggers and performing redirecting actions upon detecting such triggers. Redirecting actions can include redirecting a particular user to a new group and/or new content, redirecting a portion of a group to a new group and/or new content, merging or splitting user groups, and redirecting an entire group to new content, to name a few examples. The trigger can be identified based on thresholds, for example individual user thresholds (e.g., determining a negative reaction of a threshold level, or determining that a threshold amount of time has passed with no user reactions) or group thresholds (e.g., determining a threshold number or percentage of users provided negative reactions, or determining that a threshold amount of time has passed with no group reactions). For example, a threshold may be a time period (such as 1 minute), some position in the video timeline (such as the end of the video), a percentage of users who have voted thumbs down (such as 50% or more), a ratio of thumbs down to thumbs up (such as 1.5:1), or some combination thereof (using either logic AND or logic OR). When a trigger is detected (for example, a group watching 1 minute of a video AND 50% thumbs down), an action is taken (for example, redirect the group to a new video).

Grouping and regrouping logic 220 can be set such that only a subset of the users in a group are affected by the action (e.g., only those who reacted with thumbs down jump to a new video). Grouping and regrouping logic 220 can be set such that all users are affected by the action but are redirected to a different places (e.g., those who reacted with thumbs up go someplace else than those who reacted with thumbs down). One goal of the system, provided to grouping and regrouping logic 220, can be to try to keep as many users together as possible. An alternative goal might be to constantly ensure (as best as is possible) that groups are maintained at a given size (for example, 100 users per group). In this case, grouping and regrouping logic 220 can use a more specific recommendation algorithm to group users into multiple pools of specific sizes and intended video channel destinations (e.g. 100 people broken into: a group of 60 staying on the current video, a group of 30 jumping to a video on a new video game that currently has 70 people watching, and a group of 10 jumping to a painting livestream with 90 people watching). Grouping and regrouping logic 220 can be set in some embodiments to aim for a minimum group size.

The reactions provided by users, e.g. thumbs up and thumbs down, can be used by grouping and regrouping logic 220 to identify content to serve to a user or user group, such that the grouping and regrouping logic 220 tries to get the user/group to content they wish to see and that will elicit positive reactions. Alternatively, the grouping and regrouping logic 220 can use reactions provided by users to try to keep a user with a group of users with similar reactions. Thus, in some embodiments the grouping and regrouping logic 220 can be configured to group users socially based on programmatically-identified similarities between the users to try to create groupings of like-minded users, rather than grouping based on users' social networks of pre-known friends or acquaintances. These can be combined into a system goal of having a group of people watching a set of videos (e.g., videos in a channel) together that they all enjoy (e.g., exhibit positive reactions).

With a fast time cycle (10 seconds-1 minute being a threshold for identifying new triggers), the service 200 can obtain a lot of data regarding what a user is enjoying or not enjoying. This data may be only momentarily or short-term relevant (mood based) or medium-term relevant (a user is interested in pregnancy right now and for a limited time period) or long-term relevant (a user has a long-term love of woodworking). To deal with this, grouping and regrouping logic 220 can use a decay method around content automatically selected to serve to users so that information is quickly leveraged. For example, grouping and regrouping logic 220 can use a logarithmic function against time elapsed since a user's reaction to apply that data point to the user's identified content. To incorporate a medium or long term interest, grouping and regrouping logic 220 can leverage a clustering model of the videos (or attributes of those videos) to determine when a user reaction is similar in nature to a past user reaction. For example, if user A likes or exhibits positive reactions to videos on gardening repeatedly or over a long time period, then positive reactions to gardening provided in the more distance past could retain a higher value instead of the logarithmic value. For example, grouping and regrouping logic 220 can multiply the value of a reaction if it is observed multiple times over time.

Because grouping and regrouping logic 220 may use real-time reaction analysis to group similar users together and find suitable content for such groups, in around 5-12 videos in some embodiments the grouping and regrouping logic 220 can have a high confidence that it is selecting suitably similar user groups as well as interesting content for these groups. This can factor in the current moods of the users, as the grouping and regrouping logic 220 uses real-time reaction analysis and thus bases decisions on current signals indicating what a user likes or does not like. As such, grouping and regrouping logic 220 is able to provide fast, personalized, and currently-relevant recommendations to users.

In certain scenarios, grouping and regrouping logic 220 can determine to jump people into a specific time-code of a video. For example, if the first 10 seconds of a video has received lots of thumbs down, but user interaction tracker 215 identifies a big spike in thumbs up starting at 10 seconds, grouping and regrouping logic 220 can jump people in to that video at the 10 second mark. This can also factor in whether the users who previously provided the thumbs up and thumbs down reactions are similar to the instant user or group. Accordingly, grouping and regrouping logic can implement similarity measures when determining current actions based on past user reactions. Similarly, grouping and regrouping logic 220 can jump a user or group of users out of a video at a specific timecode based on historical reaction data. Grouping and regrouping logic 220 can also personalize time-code jumping, where one group might jump in at 10 seconds, but then a second group jumps in to join them at 90 seconds. The grouping and regrouping logic 220 can thus use a combination of video-attribute based selection and timecode-based selection.

Grouping and regrouping logic 220 can implement cross-group timing synchronization for keeping a minimum number of people together. For example, the grouping and regrouping logic 220 can serve two different videos to two different groups, where such videos start and end at the same time. Further, channels may be synchronized so that the sequence of videos in a first channel has the same start and end timecodes as the sequence of videos in a second channel. Grouping and regrouping logic may accomplish this by ordering videos of the same length in the same positions in both channels, or may use filler content to achieve this cross-channel synchronization if needed. This can allow grouping and regrouping logic 220 to merge groups, for example groups from which users have left the service 200, without interrupting the video playback of either group. In other embodiments, one group may be jumped out of the longer video at the same time as the shorter video ends in order to merge the two groups, or the group that concludes watching the shorter video may be served additional content (for example, a short clip of a similar length as the time remaining in the longer video) before the groups are merged.

In some embodiments, two or more users may be able to jointly specify to the system 200 that they wish to remain in a group together, for example via a first user sending a "stay together" invitation to a second user and the second user selecting an option to accept the invitation. In some embodiments, a user may be able to unilaterally specify that they wish to avoid being grouped with another user, for example another user who has offended them via a discussion group comment. In such embodiments, the grouping and regrouping logic 220 can incorporate rules for following user-specified grouping preferences if all such users are currently participating in the service 200. Grouping and regrouping logic 220 can also incorporate other rules that enable users to exercise some control over their redirection through the service 200, for example by providing user-selectable "leave video" options, by showing users when other users in the group leave a video, and by presenting user-selectable options for the remaining users to join the users who have left.

As described, the service 200 can also include a module for facilitating, displaying, and logging chats between user groups. The described chats or discussion comments may be ephemeral, that is, they may be visible to a user or user group while watching the video to which the comments pertain but may be inaccessible after the video concludes. In other embodiments, the described discussions may be persistent, that is they may be accessible by a user or group of users after the video to which the comments pertain has concluded. In such embodiments, each user may be able to see some or all past comments on a video. Alternatively, as the comments relate to a social setting, users may be able to see only comments on videos that were made by other users in the same group as the user (at the time the comments were made). In this example, each user may retain a history of group chats involving the user, such that the chat history of each user is unique based on the groups to which that user has been assigned and the comments made while the user was in each group. User participation in such discussions can be anonymous, or can identify users by name or code name, or a combination thereof as specified by individual user preferences.

In some embodiments, if a certain group of users is not providing above a threshold number or frequency of comments and/or reactions on a particular video, the dynamic content delivery service 200 may introduce historical comments and/or reactions to prompt socialization. These historical reactions can be shown to the group at the same timecodes at which they were originally provided. The socialization aspect of the disclosed service 200 can enhance user enjoyment of the served content and also provides data that can be leveraged to programmatically identify features of the content, potentially with greater accuracy than analysis of video frames or audio waveforms alone. In some embodiments, the user reactions can be analyzed together with video frames and/or audio waveforms to build a more complete understanding of the attributes of a video.

A user may find content they wish to continue watching as they are redirected through the system. In some embodiments, the service 200 can present a user-selectable option to leave the social grouping and redirection cycle and transition into a different mode of watching content individually and/or manually exploring the available content. Some embodiments of this mode may allow users to choose their own groups that will not be regrouped, and such groups can select their own content for viewing as a group.

The dynamic content delivery service 200 can provide user reaction timelines from the user profiles data repository 205, video profiles data repository 210, and/or user interaction tracker 215 to the machine learning system 260. Various embodiments of the machine learning system 260 can use this and/or other labeled data to create emotional reaction profiles of certain videos and users, to leverage these profiles in recommending videos to users, to learn relationships between video content and emotional reactions, to predict emotional reactions to videos based on video features, to provide feedback on video creation, to automate video creation, and to customize video viewing experiences for particular users. Due to the possible large number of timecodes in a given video, data sparsity may present problems for machine learning analysis of reaction data. As such, some embodiments of the machine learning system 260 may pre-process input reaction data for a given video before it is input into a machine learning model, for example by performing a smoothing operation such as kernel density estimation. To illustrate, consider the following example. A 2 hour move at 30 frames per second has 216,000 frames that can each be associated with a different timecode, so even if 2,000 people watch this video and each provide 10 reactions this results in 20,000 reactions. Even if these are each provided at a distinct timecode, less than 10% of timecodes have an associated provided reaction, and in reality the reactions may be grouped around particular timecodes (e.g., timecodes of highly emotional scenes). Thus, there can be timecodes with no reaction in a span of timecodes where a reaction could still occur. A smoothing operation can associate the reactions with more than one timecode to ensure that data provided to a model is smooth, resulting in a smooth model output as well. Example embodiments of the machine learning system 260 are illustrated and described in further detail with respect to FIGS. 2B-2D.

Figure 2B:
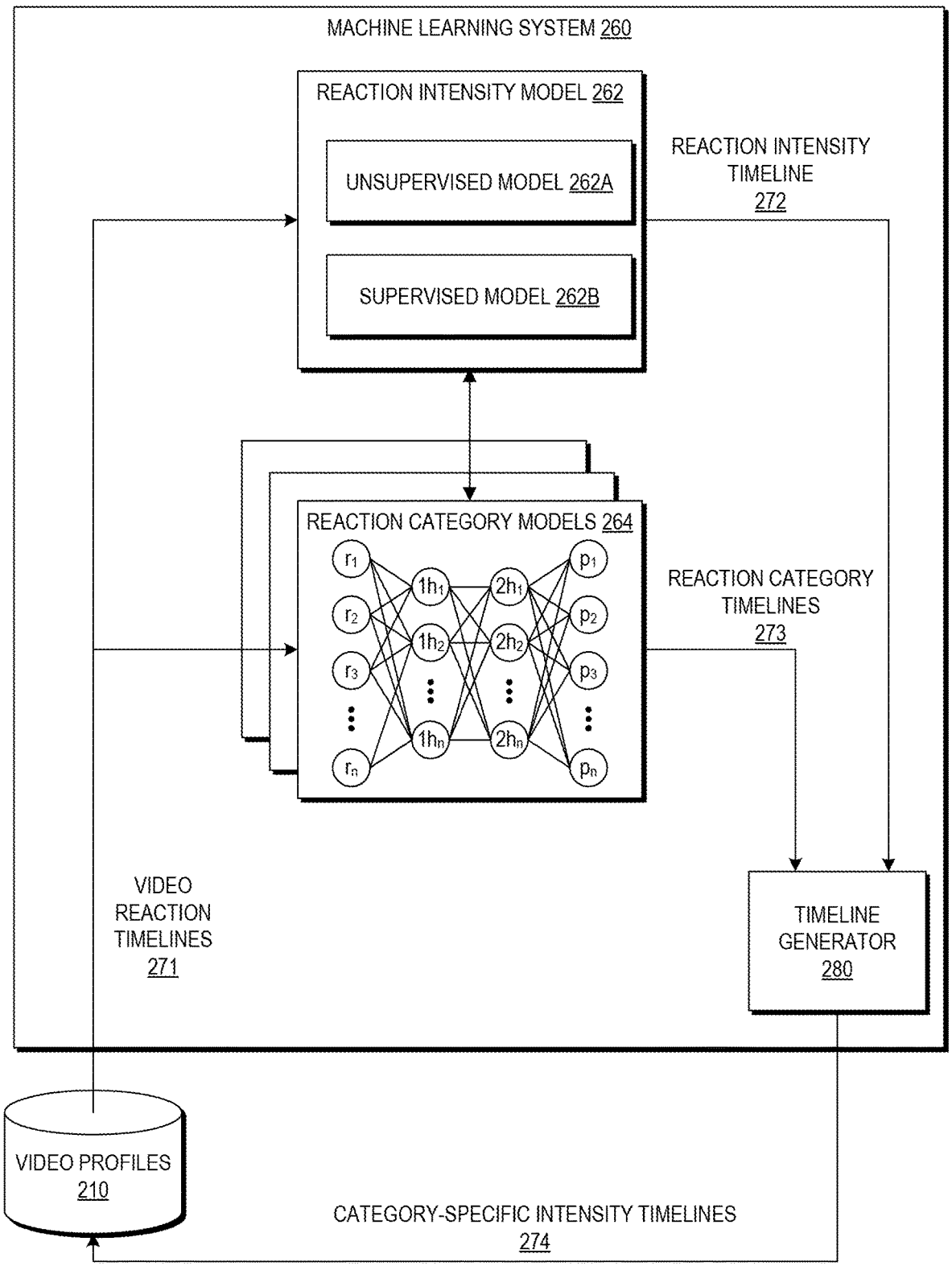
FIGS. 2B-2D illustrate various examples of the machine learning system of FIG. 2A.

FIG. 2B illustrates an embodiment of the machine learning system 260 of FIG. 2A that can be trained to identify and predict the intensities and particular categories of emotional reactions elicited at specific timecodes of videos based on reactions provided by users who have viewed and reacted to videos. As illustrated, the machine learning system 260 includes a reaction intensity machine learning model 262, a number of reaction category machine learning models 264, and a timeline generator 280. Example processes for training and using these components of the machine learning system 260 of FIG. 2B are described with respect to FIG. 3A below. The reaction intensity model 262 and reaction category models 264 can be used individually or together, and in various embodiments can either receive output from the other model or provide output to the other model.

The output of the reaction intensity model 262 can be a reaction intensity timeline 272 providing the intensity (e.g., a value reflective of the number and/or strength of provided emotional reactions) of emotional reactions at specific timecodes of the video. In order to generate this timeline 272, various embodiments of the reaction intensity model 262 can include one or both of an unsupervised machine learning model 262A and a supervised machine learning model 262B. In supervised machine learning, a model is trained using datasets including both input data and the output expected for a given input. During training, a supervised model learns the mapping function (e.g., its parameters) that best produces these expected outputs from the corresponding input data given an optimization function. Once trained, such supervised models can be used to predict outputs given new inputs. In contrast, in unsupervised learning the model is provided only with input data without a known, corresponding output. The goal of unsupervised learning models is to model the underlying structure or distribution of the data, for example by discovering inherent groupings in the data (e.g., clustering models) or inherent rules that describe large portions of the data (e.g., association models). Some embodiments of the reaction intensity model 262 can implement multiple versions of the models 262A, 262B, for example to generate reaction intensity timeline models for different genres of videos (e.g., comedy, romance). These timelines can be used to understand the plot tension densities (e.g., when users react with different intensities) in different genres.

The unsupervised machine learning model 262A in some embodiments is configured to receive input user reactions to timecodes along video timelines and to generate timelines representing intensities of any or all emotional reactions at the timecodes of the video, for example by clustering and/or unsupervised associations relating to vector spaces, for example matrix factorization. Suitable unsupervised clustering models include k-means and Gaussian mixture models. However, their similarity measures may be unable to capture rich latent data structures (e.g., hidden relationships between portions of the input data). As such, some embodiments of the reaction intensity model 262 can use autoencoder neural networks, for example variational autoencoder neural networks such as Gaussian mixture variational autoencoder that combine variational Bayesian methods with the flexibility and scalability provided by neural networks in order to perform unsupervised clustering through a deep generative model. Such Gaussian mixture variational autoencoders can receive as input a prior over latent variables (here, a distribution of the emotional reactions at various timecodes) and can learn parameters during training that allow the encoder and decoder layers of the autoencoder to output the conditional posterior (e.g., a distribution of reaction intensities).

Some embodiments of the reaction intensity model 262 can additionally or alternatively use a supervised machine learning model 262B, to identify the emotional reaction intensities associated with video features (e.g., see FIG. 2D), or with mined keywords and/or phrases in user textual comments. One challenge of teaching computers to effectively understand the particular intensity and category of emotion expressed by words (as in user-submitted messages and comments) is that language, particularly with respect to colloquial expressions, changes rapidly. Using a supervised machine learning model 262B can allow the model to stay on top of language trends by correlating specific words, phrases, punctuation, or text formatting (e.g., capitalization patterns) with specific user emotions.

For example, some embodiments of the supervised model 262B can implement a feedforward neural network architecture as described in more detail below. This neural network can be trained using inputs of user-submitted textual reactions, for example clustered using unsupervised machine learning model 262A and/or based on timecode, with expected outputs of reaction intensity timelines 272 generated by the unsupervised model 262A. The neural network can thus learn parameters that correlate specific textual features with specific emotional reaction intensities, and the trained network can be used to determine the intensity of emotion represented by the textual features.

Variations of this neural network of the supervised model 262B can be trained using expected outputs of reaction category timelines 273, and thus can learn to correlate specific textual features with specific categories of emotional reactions. Still other variations can be trained using expected outputs of category-specific intensity timelines 274, and thus can learn to correlate specific textual features with both specific categories of emotional reactions and the intensities of those reactions. Thus, in some embodiments the reaction intensity model 262 can identify reaction categories in addition to (or alternatively to) identifying reaction intensities.

Although the unsupervised learning of FIG. 2B is discussed in the context of using multiple user-submitted reactions to generate a reaction intensity and timeline for a particular video, it will be appreciated that similar techniques can be adapted to generate such timelines for particular users. For example, a user can submit reactions along the timelines of a number of different videos. The machine learning system 260 can use these timelines to determine the intensities of emotional reactions typically submitted by the user to videos, or more specifically to different types of visual or audio content in videos.

The reaction category model 264 may receive the output of the reaction intensity model 262 or may be used independently of the reaction intensity model 262 to categorize provided reactions without knowledge of emotional intensity. In some embodiments, the output of the reaction intensity model 262 may or may not be provided to the reaction category model, but can be used (e.g., in a large-scale video processing environment) to identify videos that should be analyzed by the reaction category model (e.g., videos exhibiting reaction intensities above a threshold level, for timecodes spanning greater than a threshold length of time, and/or during greater than a threshold percentage of video timecodes). The reaction category model 264 is depicted with an example deep feedforward neural network having a number of input nodes $r_1$-$r_n$ in an input layer, a number of hidden nodes $1h_1$-$1h_n$ in a first hidden layer, a number of hidden nodes $2h_1$-$2h_n$ in a second hidden layer, and a number of output nodes $p_1$-$p_n$ in an output layer. The values input into $r_1$-$r_n$ can represent the different reactions provided at timecodes of the video, with each timecode (or group of timecodes, for example of a particular scene) assigned to one of the input nodes. The nodes of the layers (represented by circles in FIG. 2B) are connected to the nodes in adjacent layers by connections (represented by the lines between circles). As described in more detail below, the nodes in each layer send data to connected nodes in a next layer, with learned parameters transforming the values as they are propagated forward through the network. The parameters of the hidden layers, once trained, represent relationships between the input data and the output data.

Artificial neural networks, such as autoencoder neural networks, feedforward neural networks, recurrent neural networks, and convolutional neural networks, are artificial in the sense that they are computational entities implemented by computing devices. Such neural networks typically have multiple layers of nodes. The input layer has input nodes which send data via connections to the hidden layer of nodes, and then via more connections to the output layer of output nodes. Each hidden layer can transform the input data and output the transformed data for use by a subsequent layer. Activation functions and patterns in the hidden layer can be considered as an encoding of how the network is programmed to identify significant features of the inputs. Though illustrated with a two hidden layers, the neural network of the reaction category models 264 can have any number of intermediate, internal, or "hidden" layers between the input and output layers. The artificial neural networks described herein may be "deep" in that they have two or more hidden layers.

The individual layers may include any number of separate nodes. Each node can be considered as a computer-implemented simulation of a biological neuron and represents a connection between the output of one node to the input of another. Thus, a node may be thought of as a computational unit that computes an output value as a function of a plurality of different input values. Each individual node may have a summation function which combines the values of all its inputs together, a threshold function, and/or limiting function on each connection and on the node itself such that it must surpass it before it can propagate to other neurons.

Each node can be logically connected with many others by synapses/connections, for example with some or all nodes in adjacent layers. Nodes may be considered to be "connected" when the input values to the function associated with a current node include the output of functions associated with nodes in a previous layer, multiplied by weights associated with the individual "connections" between the current node and the nodes in the previous layer. Such connections can be enforcing or inhibitory in their effect on the activation state of connected nodes. The connections may store parameters called weights that can manipulate the data in the calculations. The strengths of node connections are typically learnt from data during the training process.

The parameters of the neural network (e.g., the strengths of node connections) can be set in a process referred to as training. For example, neural network can be trained using training data that includes input data and the correct or preferred output of the model for the corresponding input data. Sets of individual input vectors ("mini-batches") may be processed at the same time by using an input matrix instead of a single input vector, which may speed up training. The neural network can repeatedly process the input data, and the parameters (e.g., the weight matrices) of the neural network can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

When the neural network is used to process input data in the form of an input vector (e.g., a batch of training data input vectors or an inference-stage input vector), the neural network may perform a "forward pass" to generate an output vector. The input vectors may each include n separate data elements or "dimensions," corresponding to the n nodes of the neural network input layer (where n is some positive integer). Each data element may be a value, such as a floating point number or integer. The forward pass includes multiplying the matrix of input vectors by a matrix representing the weights associated with connections between the nodes of the input layer and nodes of the next layer, and applying an activation function to the results. The process is then repeated for each subsequent neural network layer.

The neural network can have thousands of nodes, and thousands of weights for connections between the nodes of all of the adjacent layers. As such, the neural network may consume a large amount of space when stored, a large amount of bandwidth when transmitted, a large amount of memory when trained, and a large amount of processing resources when used for inference due to the large number of calculations to be performed. In some cases, neural network may be so large that it cannot practically be implemented with a single processor (e.g., it may require more memory than is available to a single processor). The neural network would then typically be split up and distributed among multiple processors.

The reaction category model 264 can include multiple models each trained to identify or predict whether a detected reaction corresponds to a different one of a number of emotional reaction categories. For example, one model can be trained to identify happy emotional reactions, one model can be trained to identify sad emotional reactions, one model can be trained to identify fear emotional reactions, and so on. As such, the reaction category model 264 can include a set of models corresponding to a set of emotional categories of interest. The set of models can be considered as different versions of the same machine learning model, that is, they share a common architecture but learn different parameters depending upon the emotional reaction category they are trained to identify. During training, each model can be provided with input of the reaction intensity timeline output by the reaction intensity model 262, or with one or more video reaction timelines 271 representing provided reactions of users. Optionally, the models can also be provided with video attributes, for example a category of the video (e.g., horror, comedy, sentimental) or features in the video content (e.g., visual and audio features occurring at particular timecodes). Each model can also be provided with expected output including the corresponding labeled reaction category for the video. For example, the labels (e.g., which category the reaction belongs to) can be determined based on explicit reaction indicators provided by users of the dynamic content delivery system 200 (e.g., particular selected emoticons or words in textual comments). The network can be trained through backpropagation to predict the expected outputs from the provided inputs, and the trained parameters can be stored for use in the inference stage. The trained parameters represent relationships between the input emotional intensity data (and any input video attributes) and the output reaction categories.

During the inference stage of using a trained set of models, each timecode (or predetermined time interval, for example including all of the timecodes in a particular scene) of a video can have a corresponding probability value ($p_1$-$p_n$) output from each of the models of the reaction category model 264. As such, the reaction category models 264 can output a number of reaction category timelines 273 each representing the probability that a particular category of emotional reaction occurred at a certain timecode of the video.

Though described as using a set of models each having, for example, a multiclass classifier as the output layer of the neural network, other examples of the reaction category model 264 can be implemented a single neural network that feeds its output into a multiclass classifier. Multiclass or multinomial classification is the problem of classifying instances into one of the more than two classes, with suitable multiclass models including softmax regression or multinomial logistic regression. Some embodiments may use multiple regression to provide an output value along a range of output values, for example outputting a value of 0.86 on a scale of 0 to 1 indicating that a scene is 86% likely to elicit a particular reaction. Multilabel classification is a classification problem where multiple target labels can be assigned to each observation instead of only one like in multiclass classification, with example multilabel classifiers including k-nearest neighbors, decision trees, boosting, and neural networks.

Although the supervised learning of FIG. 2B is discussed in the context of using submitted reactions from many users to determine which categories of reaction correspond to different detected reaction intensities along the timeline for a particular video, it will be appreciated that similar techniques can be adapted to generate such timelines for particular users. For example, a user can submit reactions along the timelines of a number of different videos, where the categories of these videos are known. The machine learning system 260 can use these timelines to determine the intensities of emotional reactions typically submitted by the user to different categories of videos, or more specifically to different types of visual or audio content in different categories of videos.

The output reaction intensity timeline 272 and/or reaction category timelines 273 can be output to the timeline generator 280. The timeline generator 280 can use these input timelines to generate a number of category-specific intensity timelines 274 for the video. For example, timeline generator 280 can assign the detected intensity of emotional reaction at a timecode to the emotional category of the model that output the highest probability in some embodiments. In other embodiments, for example where multiple models output probabilities greater than a threshold value, the timeline generator 280 can split the detected intensity of emotional reaction at the timecode among the reaction categories of these models, for example proportionally according to the determined probabilities. The category-specific intensity timelines 274 can be stored in association with the video in the video's profile in the video profiles data repository 210.

The timeline generator 280 can generate a plot-tension timeline for a video, as described above, by overlaying the category-specific intensity timelines 274 onto a single timeline. The timeline generator 280 can output a visual representation of the plot tension timeline to a user, or can store the plot tension timeline in association with the video for use in recommending the video to users and/or assessing qualities of the video.

Figure 2C:
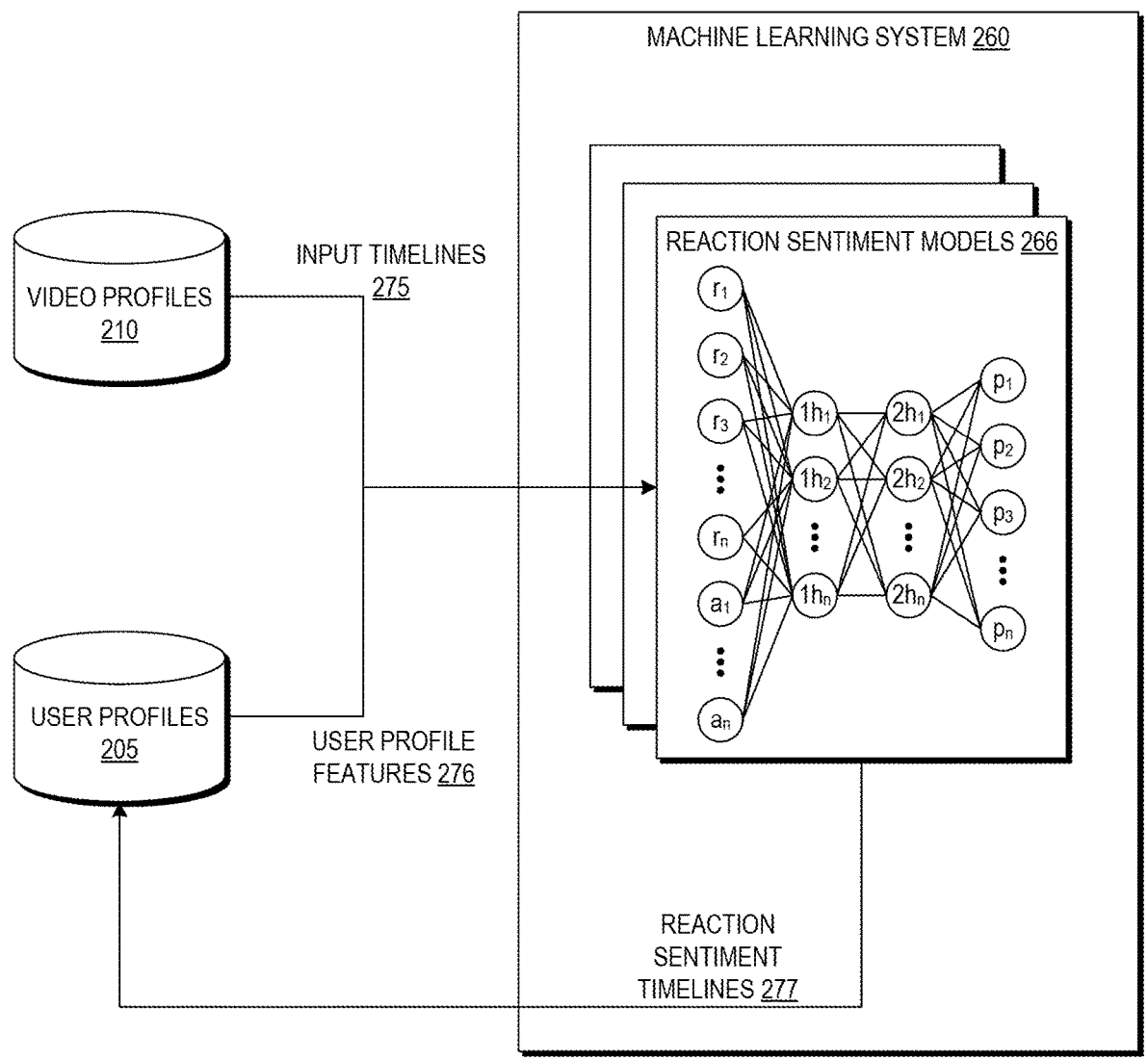

FIG. 2C illustrates an embodiment of the machine learning system 260 of FIG. 2A that can be trained to predict the subjective sentiment regarding specific categories of emotional reactions for a particular user or user segment. In some examples, the embodiments of FIGS. 2B and 2C can be used together in the machine learning system 260. Example processes for training and using the machine learning system 260 of FIG. 2C are described with respect to FIG. 3B below.

The machine learning model 260 as shown in FIG. 2C includes reaction sentiment models 266. These models receive input timelines 275 from the video profiles data repository 210 and also receive user profile features 276 from the user profiles data repository 205, and transform these inputs into output reaction sentiment timelines 277. The reaction sentiment timelines 277 indicate how a particular emotional reaction of a given category at an identified intensity is likely to be experienced by the user along a spectrum of positive to negative. Such reaction sentiment timelines 277 can be valuable in determining whether a particular video is a good recommendation for a particular user.

The reaction sentiment models 266 are depicted with the example of a feedforward neural network with a number of nodes of an input layer that receive emotional reaction values $r_1$-$r_n$ as well as user attribute values $a_1$-$a_n$, a number of hidden nodes $1h_1$-$1h_n$ in a first hidden layer, a number of hidden nodes $2h_1$-$2h_n$ in a second hidden layer, and a number of output nodes $p_1$-$p_n$ in an output layer. As described above, the nodes in each layer send data to connected nodes in a next layer, with learned parameters transforming the values as they are propagated forward through the network. The parameters of the hidden layers, once trained, represent relationships between the input data and the output data. Similar to the reaction category models 264 described above, the reaction sentiment models 266 can each be trained to assess user sentiment regarding a different emotional reaction category. Here, because the input layer also includes values of user attributes $a_1$-$a_n$, the reaction sentiment models 266 can be used to determine whether identified reaction at a particular timecode of a video is likely to be perceived as positive or negative for a particular user.

The user attributes can include features of the user mined from a history of reactions provided by the user or demographic features of the user. For example, user reactions can indicate preferences such as the user not liking horror content but liking awkward content. Thus, user attributes can represent general likes and dislikes of the user with respect to types of content. Recent user reactions (e.g., during a current video viewing session) can indicate a current mood of the user. Thus, user attributes can include a sequence of recent reactions or data gleaned from such reactions indicating a current mood of the user. User attributes may also include features of the user mined from interactions with other content systems, for example with an electronic catalog of items including products or services for purchase or rental. User attributes may be represented as a vector for input into the neural network.

During training, each reaction sentiment model 266 can be provided with input including the appropriate category-specific intensity timeline 274 (e.g., the happy category-specific intensity timeline 274 is provided to the happy reaction sentiment model 266) as well as user attributes. Optionally, the input timeline can also include features of the video content. Each reaction sentiment model 266 can also be provided with expected output including the user sentiment regarding the particular emotional reaction. In some embodiments, user sentiment can be mined from textual comments submitted by the user (e.g., "this is so scary but I love it"). In some embodiments, user sentiment can be mined from a combination of textual comments and submitted reactions (e.g., submission of an awkward emoticon with a comment of "this scene is great!"). In some embodiments, user sentiment can be explicitly collected by asking of users to label their sentiments regarding their provided reactions, for example among a pool of users selected to develop the training data set. Through backpropagation, the reaction sentiment model 266 can learn the parameters that allow it to predict the expected output from the provided input. Thereafter, these parameters can be stored as a trained reaction sentiment model (or set of models), and the trained model can be used to predict sentiment of other users.

Figure 2D:
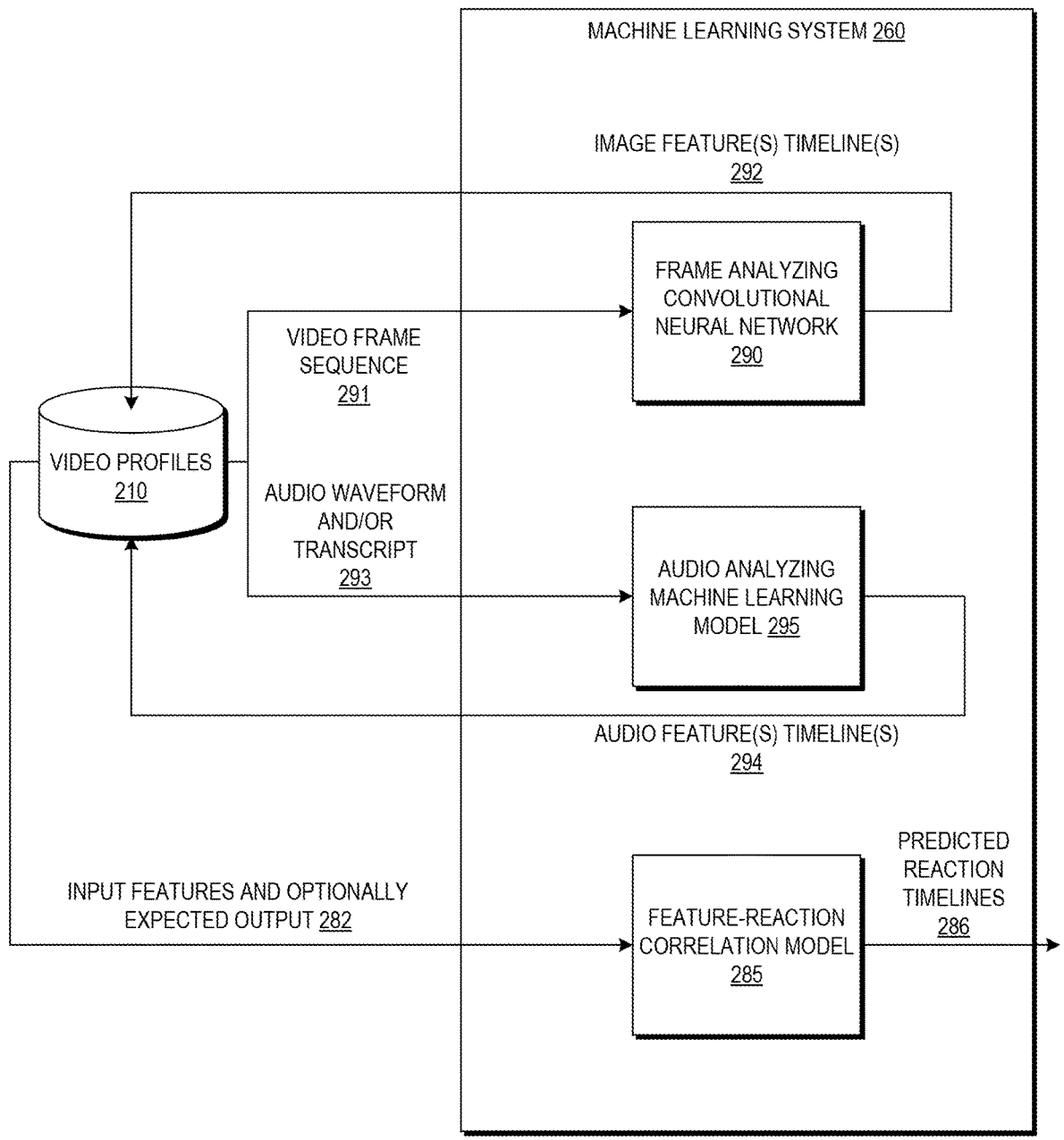

FIG. 2D illustrates an embodiment of the machine learning system 260 of FIG. 2A that can be trained to identify features of videos, to correlate the features with particular emotional reactions, and to use the identified correlations to predict emotional reaction timelines of the videos. The embodiment of the machine learning system 260 as shown in FIG. 2D includes three machine learning models—frame analyzing convolutional neural network 290, audio analyzing machine learning model 295, and feature-reaction correlation machine learning model 285—which can be any of the described artificial neural networks or the other types of machine learning models described below. In some examples, the embodiments of FIGS. 2B and 2D can be used together in the machine learning system 260. Example processes for training and using the machine learning system 260 of FIG. 2D are described with respect to FIG. 4 below.

The frame analyzing convolutional neural network 290 is a convolutional neural network trained to receive an input video frame sequence 291 and output a timeline of identified image features 292. It will be appreciated that in other embodiments, neural networks other than a convolutional neural network, and/or image object classification models other than neural networks, may be used instead of or in addition to a convolutional neural network in order to identify image features. As described above with respect to neural networks, a convolutional neural network can include an input layer, at least one (or at least two for deep networks) hidden layer, and an output layer. Convolutional neural networks are particularly well suited for analysis of image data. The layers can be structured to receive two or three dimensional volumes of data, corresponding to the width and height of a single image or the widths and heights of a stack of images (e.g., the frames in a video sequence) The nodes inside a layer of a convolutional neural network are only connected to a small region of the width and height layer before it (called a receptive field), reducing the amount of computation by making the forward function more efficient to implement and vastly reducing the amount of parameters in the network. The nodes in each convolutional layer of a convolutional neural network can share weights such that the convolutional filter of a given layer is replicated across the entire width and height of the input volume, reducing the overall number of trainable weights and increasing applicability of the convolutional neural network to data sets outside of the training data.

During training, the frame analyzing convolutional neural network 290 can repeatedly process the input data, and the convolutional filters (e.g., its weight matrices) can be modified in what amounts to a trial-and-error process until the convolutional neural network produces (or "converges" on) the correct or preferred output. The modification of weight values may be performed through backpropagation. Once trained, the frame analyzing convolutional neural network 290 can take new input images and determine whether they include the features it was trained to identify. The frame analyzing convolutional neural network 290 may include many separate convolutional neural networks each trained to identify a specific object in input image data. The identified objects can each be associated with the timecode(s) at which they appear and output as image feature(s) timeline(s) 292 for storage in association with the video in the video profiles data repository 210. This can include a single timeline for all identified image features or separate timelines for each identified image feature.

The audio analyzing machine learning model 295 can include one or more suitable machine learning models for identifying words, phrases, sounds (e.g., laughter, dog barking, scream, screeching tires), and musical qualities (e.g., key, tempo, volume) in input audio waveforms and/or dialogue transcripts 293. Example suitable models include neural networks (e.g., feedforward neural networks and recurrent neural networks), decision trees, Gaussian mixture models, support vector machines, and Mel Frequency Cepstral coefficients. Each of a number of models can be trained to identify a different feature, or a single model can be trained to identify multiple features of interest. The identified audio features can each be associated with the timecode(s) at which they appear and output as audio feature(s) timeline(s) 294 for storage in association with the video in the video profiles data repository 210. This can include a single timeline for all identified audio features or separate timelines for each identified audio feature.

The feature-reaction correlation machine learning model 285 receives input features for a video, and once trained, outputs predicted reaction timelines 286. Example suitable models include neural networks, decision trees, and clustering models, and as described above may include multiple of a model each trained with respect to a different category of reaction. The input features can include one or more of image features timelines 292, audio features timelines 294, or similar timelines of image or audio features generated by other methods. During training, the feature-reaction correlation machine learning model 285 receives the expected output for the video, which can include any of the emotional reaction timelines described above (e.g., a general reaction intensity timeline, one or more timelines of particular reaction categories, one or more timelines of particular reaction categories and intensities, and timelines reflective of user-specific attributes and preferences). The feature-reaction correlation machine learning model 285 learns the parameters that enable it to predict these known emotional reaction timelines from the provided input video features, and then these parameters are stored for use in making predictions about emotional reactions that are likely to be elicited by other videos.

Overview of Example Machine Learning Processes

Figure 3A:
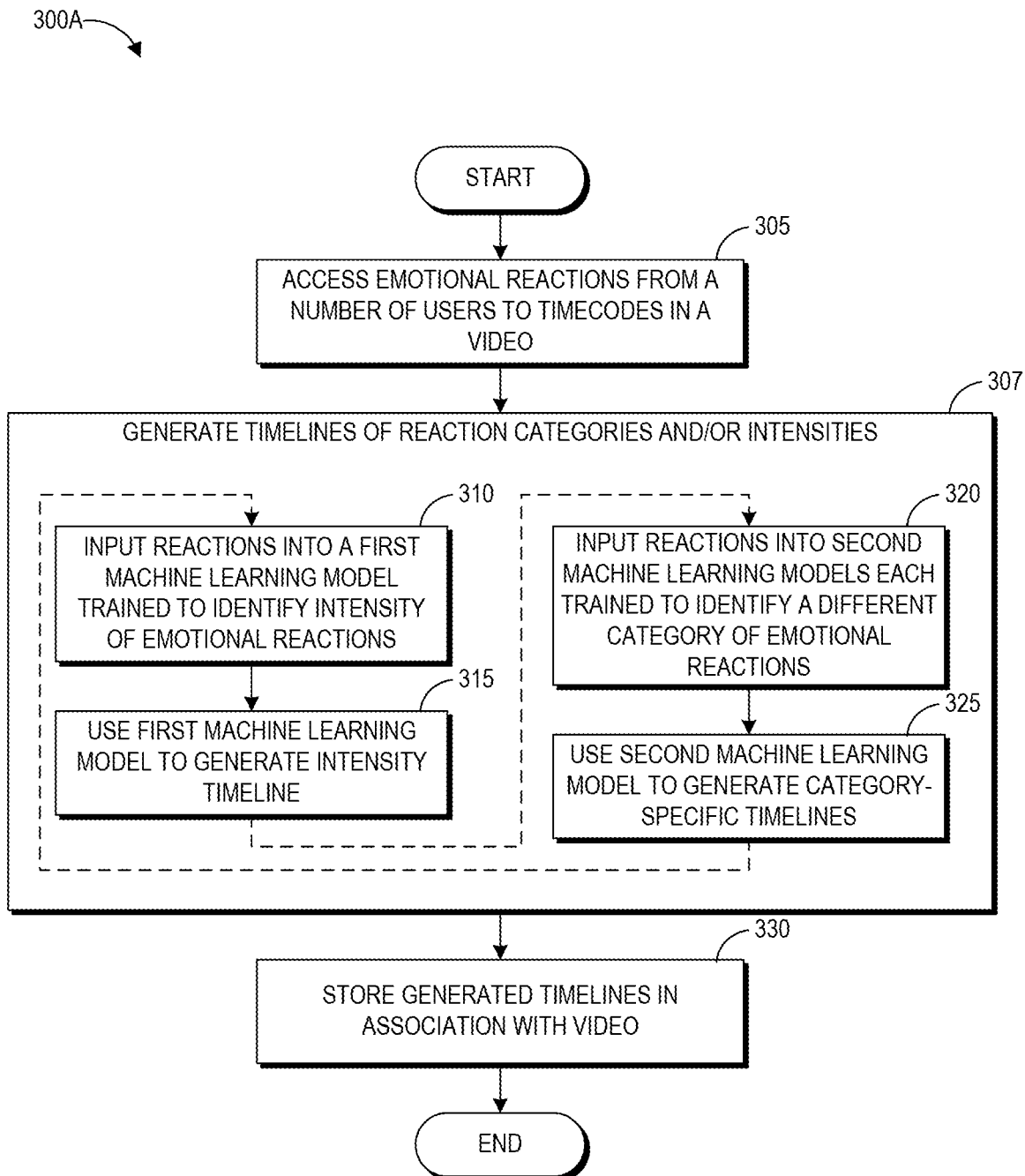
FIG. 3A is a flow diagram of an illustrative process for generating reaction timelines for videos using the machine learning system of FIGS. 2A-2B according to some embodiments.

FIG. 3A is a flow diagram of an illustrative process 300A for generating reaction timelines for videos using the machine learning system 260 of FIGS. 2A-2B or another suitable service according to some embodiments. Though particular blocks are described with respect to particular components of the machine learning system 260, it will be appreciated that the described functions could be performed in alternate embodiments by other suitable modules or components of the machine learning system 260.

The process 300A may begin in response to an event, such as on a predetermined or dynamically determined schedule, on demand when initiated by a system administer, or in response to some other event. When the process 300A is initiated, a set of executable program instructions stored on one or more non-transitory computer-readable media (e.g., hard drive, flash memory, removable media, etc.) may be loaded into memory (e.g., random access memory or "RAM") of a server or other computing device of the machine learning system 260. The executable instructions may then be executed by a hardware-based computer processor (e.g., a central processing unit or "CPU") of the computing device. In some embodiments, the process 300A or portions thereof may be implemented on multiple computing devices and/or multiple processors, serially or in parallel.

At block 305, the machine learning system 260 accesses emotional reactions provided by a number of users to a timecodes of a video. The reactions may be mined from the dynamic content delivery service 200 in some embodiments or obtained from another suitable source of user reaction data.

The process 300A then transitions to block 307 at which the machine learning system 260 generates timelines representing the categories, intensities, or both of the provided user reactions. As illustrated, block 307 includes a first pipeline (blocks 310 and 315) for determining reaction intensities and a second pipeline (blocks 320 and 325) for determining reaction categories. Various implementations may use just one pipeline to determine either reaction intensity or reaction category. Other implementations of the process 300A for determining both reaction intensity and reaction category can use both pipelines in sequence or in parallel. In some embodiments, the results of the reaction intensity determination can be fed as input into the reaction category determination, and vice versa, as discussed above with respect to FIG. 2B.

At block 310, the machine learning system 260 inputs the provided reactions into a first machine learning model (e.g., reaction intensity model 262) trained to identify intensity of emotional reactions. As described above, this can be a supervised or unsupervised machine learning model that determines the intensity of emotional reactions at different timecodes throughout the video, with such timecodes corresponding to individual timecodes of the video or bins of timecodes (e.g., an entire scene). For supervised versions, the reaction intensity model 262 may optionally receive inputs of timelines of identified video features in order to determine the intensity of reaction based on features of the video.

At block 315, the machine learning system 260 uses the first machine learning model to generate intensity timeline representing the number and/or strength of emotional reactions at different timecodes throughout the video. Such a timeline can represent generally the intensity of any emotional reactions provided throughout the course of the video.

At block 320, the machine learning system 260 inputs the provided reactions (and/or the reaction intensity timeline) into second machine learning models (e.g., reaction category models 264) each trained to identify a different category of emotional reactions. Optionally, the machine learning system 260 can also input timelines of identified video features into the second machine learning models. Alternatively, the machine learning system 260 can input the intensity timeline (and any desired video feature timelines) into a single model trained to identify whether the identified intensity of emotional reaction belongs to one of a number of reaction categories.

At block 325, the machine learning system 260 uses second machine learning model(s) to generate category-specific intensity timelines. As described above, these can represent the intensity of specific emotional reactions elicited at various timecodes throughout the video. FIGS. 1A and 1B present graphical depictions of example category-specific intensity timelines.

At block 330, the machine learning system 260 stores the category-specific intensity timelines in association with the video, for example in video profiles data repository 210. Optionally, at or after block 330, these category-specific intensity timelines can be output to a user interface (e.g., as a graphical representation of a plot tension timeline) or used as discussed with respect to FIG. 3B to provide a recommendation of the video to a user.

Figure 3B:
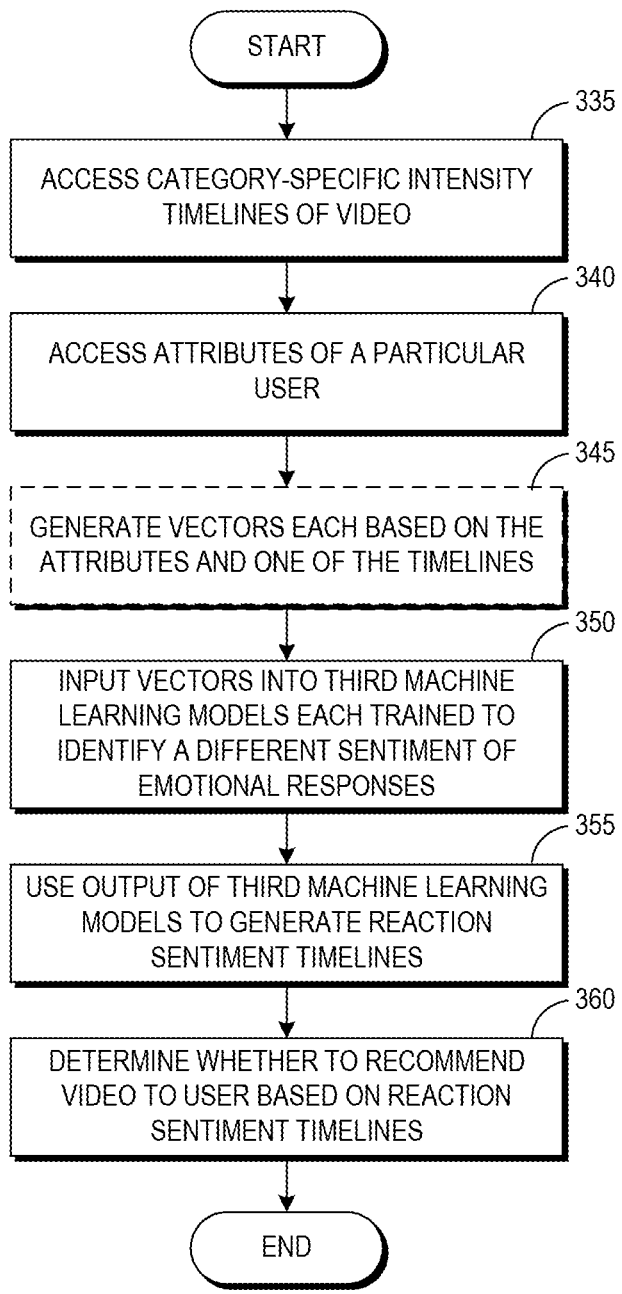
FIG. 3B is a flow diagram of an illustrative process for generating user-specific predictions regarding sentiments regarding predicted reactions using the machine learning system of FIGS. 2A-2C according to some embodiments.

FIG. 3B is a flow diagram of an illustrative process 300B for generating user-specific predictions regarding sentiments regarding predicted reactions using the machine learning system of FIGS. 2A-2C or another suitable system. The process 300B may begin in response to an event, such as on a predetermined or dynamically determined schedule, for example in response to a determination that a user is watching a video or should be presented with a recommendation for a video. When the process 300B is initiated, a set of executable program instructions stored on one or more non-transitory computer-readable media (e.g., hard drive, flash memory, removable media, etc.) may be loaded into memory (e.g., random access memory or "RAM") of a server or other computing device of the machine learning system 260. The executable instructions may then be executed by a hardware-based computer processor (e.g., a central processing unit or "CPU") of the computing device. In some embodiments, the process 300B or portions thereof may be implemented on multiple computing devices and/or multiple processors, serially or in parallel.

At block 335, the machine learning system 260 accesses category-specific intensity timelines of video. For example, these can be the category-specific intensity timelines generated using process 300A described above.

At block 340, the machine learning system 260 accesses attributes of a particular user. As described above, the attributes can be mined from past reactions provided by the user, from interactions between the user and other networked systems (e.g., electronic catalogs, social media), or may include demographic information of the user (e.g., age, geographic region of residence).

At block 345, the machine learning system 260 can generate a number of input vectors each based on the profile features and one of the timelines of the video. For example, the machine learning system 260 can generate a first vector representing a happy emotional reaction timeline and the user attributes, and a second vector representing a sad emotional reaction timeline and the user attributes. Thus, each vector can include the same vector representation of the user attributes and a vector representation of a particular emotional reaction timeline. The vector representation of user attributes can be generated using a word-to-vector machine learning model, or can be a sequence of values representing, for a predetermined list of attributes, whether a user has an attribute ("1") or does not have the attribute ("0") or how much a user has an attribute (e.g., value between 0 and 1). The vector representation of a timeline can include a binary 1 or 0 representation of the occurrence or non-occurrence of an emotional reaction at a particular timecode, or may include a value, for example between 0 and 1 indicating a strength of the emotional reaction at the timecode. In some embodiments user attribute and timeline data may be stored in this format, and thus block 345 can be optional, as such data could be directly input into the input nodes of a neural network.

At block 350, the machine learning system 260 can input vectors into third machine learning models (e.g., reaction sentiment models 266) each trained to identify the sentiment of the user towards a different category of emotional responses. For example, one of the third machine learning models can be trained to identify whether the user perceives awkward content as positive, negative, or neutral, or how the user perceives awkward content on a scale from positive to negative. Block 350 may only be performed for "ambiguous" emotional reactions such as awkward, gross, and cheesy that are not empirically positive (e.g., like a happy reaction) or empirically negative (e.g., like a furious reaction).

At block 355, the machine learning system 260 can use the output of third machine learning models to generate reaction sentiment timelines or an aggregate reaction sentiment timeline indicating how likely the user is to feel positively, neutrally, or negatively (or a value on a scale of positive to negative) about particular time codes or scenes of the video.

At block 360, the machine learning system 260 can determine whether or how to recommend the video to the user based on the generated reaction quality timelines. For example, in one embodiment the system 260 can determine to recommend the video to the user if the user is predicted to experience above a threshold percentage of positive reactions, or longer than a predetermined threshold time period of continuous positive reactions. Some examples may select to recommend videos to users based on the predicted reactions being positive at particular time codes in the video, for instance at the beginning of the video and at the end of the video. In another example, if there are any timecodes or scenes with predicted negative reactions, or negative reactions above a threshold intensity, the system 260 may prevent the video from being recommended to the user. These techniques can be used in combination in some embodiments.

In one embodiment, the recommendation generated at block 260 can be used to generate filters for specific videos that will skip, mute, or otherwise alter scenes that are determined to be likely to produce negative sentiment from the user. A user may be presented with an option to allow the system to filter the video automatically, or may be presented with options at the identified negative scenes to skip or mute the scene. If the user selects the automatic filtering option, the system still can alert the user when a scene was skipped or altered.

Figure 4:
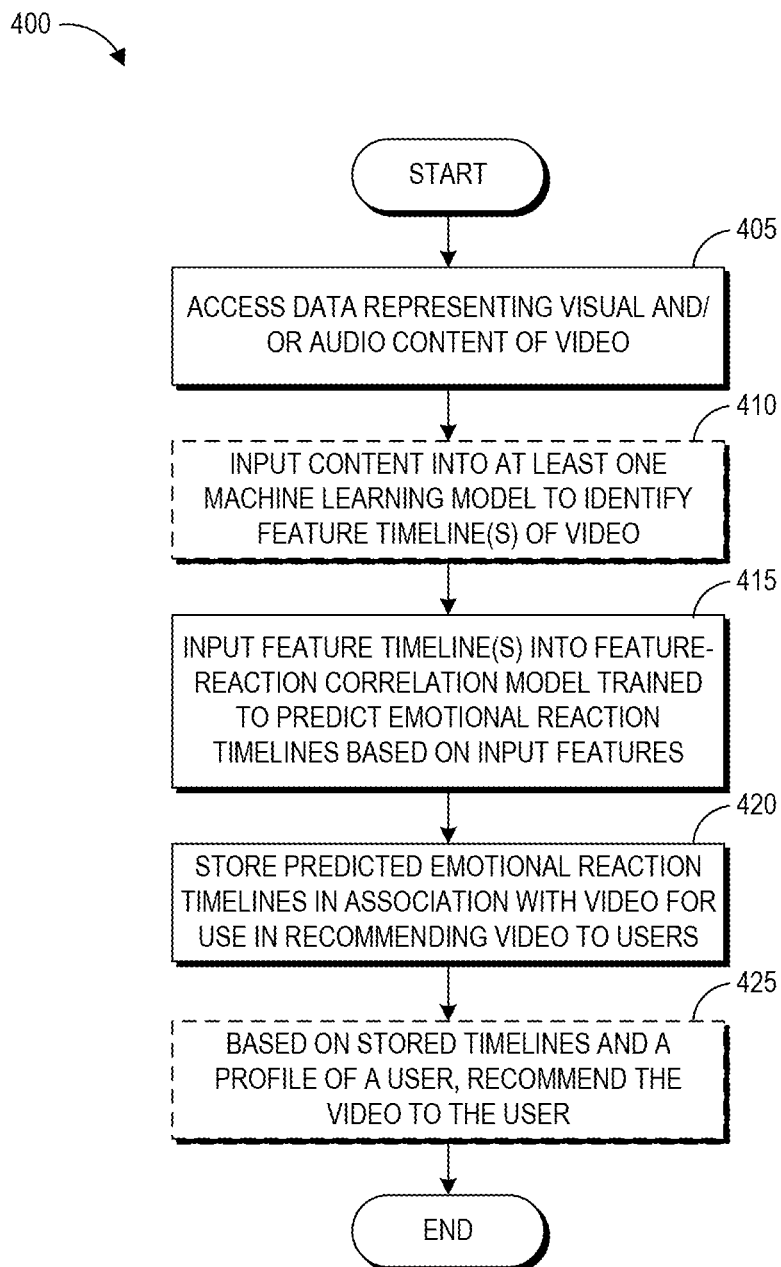
FIG. 4 is a flow diagram of an illustrative process for predicting reaction timelines for videos based on features identified in the videos using the machine learning system of FIGS. 2A-2D according to some embodiments.

FIG. 4 is a flow diagram of an illustrative process 400 for predicting reaction timelines for videos based on features identified in the videos using the machine learning system 260 of FIGS. 2A-2D or other suitable systems.

The process 400 may begin in response to an event, such as on a predetermined or dynamically determined schedule, for example periodically for new videos or in response to a determination that a new video has been added. When the process 400 is initiated, a set of executable program instructions stored on one or more non-transitory computer-readable media (e.g., hard drive, flash memory, removable media, etc.) may be loaded into memory (e.g., random access memory or "RAM") of a server or other computing device of the machine learning system 260. The executable instructions may then be executed by a hardware-based computer processor (e.g., a central processing unit or "CPU") of the computing device. In some embodiments, the process 300B or portions thereof may be implemented on multiple computing devices and/or multiple processors, serially or in parallel.

At block 405, the machine learning system 260 can access data representing visual and/or audio features of video content. For example, such features can be automatically identified by the frame analyzing convolutional neural network 290 and audio analyzing machine learning model 295. In other examples, the features can be manually identified by a person tasked with feature identification, user-identified, or pre-identified by the creator or uploader of the video. In some examples, these features may be unknown and block 405 can involve accessing the video frames, audio waveforms, or dialogue transcripts of the video.

Optionally at block 410, in examples that require identification of features, the machine learning system 260 can input the video content into at least one machine learning model (e.g., the frame analyzing convolutional neural network 290 and audio analyzing machine learning model 295) to identify feature timeline(s). The feature timeline(s) can include timecodes and associated identified visual and audio features of the video.

At block 415, the machine learning system 260 can input the identified feature timeline(s) into feature-reaction correlation model 285 trained to predict emotional reaction timelines based on input video features. At block 415, the feature-reaction correlation model 285 can use its trained parameters to predict one or more emotional reaction timelines for the video based on the input features.

At block 420, the machine learning system 260 can store the predicted emotional reaction timelines in association with video. As described above, the stored timelines can be used to generate recommendations, or to provide feedback to a video creator. Thus, some embodiments of the process 400 may be trained based on data from the dynamic content delivery service 200, but then used at the inference stage in a video creation and editing environment.

Optionally, at block 425, the machine learning system 260 can recommend the video to a user based on the stored timelines and a profile of the user. This recommendation can be performed by the dynamic content delivery service 200 in some embodiments. Some embodiments can use the process 300B to determine whether to recommend the video to the user based on the predicted reaction timelines for the video and attributes of the user.

In some embodiments, the process 400 can be performed in real time as a live streamer is streaming audio and/or video content to users in order to predict a future emotional reaction timeline of the stream. The predicted future emotional reaction timeline can be compared to a desired emotional reaction timeline, and the results can be used to identify recommended actions at certain times that the streamer can perform to attain the desired emotional reaction timeline. For example, the streamer may be streaming a live stream of video game play, and the machine learning system 260 can output recommended in-game actions that the user could take (e.g., now, in 30 seconds, in 1 minute) in order to increase emotional reactions from viewers. Beneficially, such feedback can help the streamer to create an enjoyable experience for the audience, potentially boosting their ratings or viewership. Similar recommendations can be presented in other live streaming contexts, for example live cooking shows, news broadcasting, and radio shows.

Execution Environment

Figure 5:
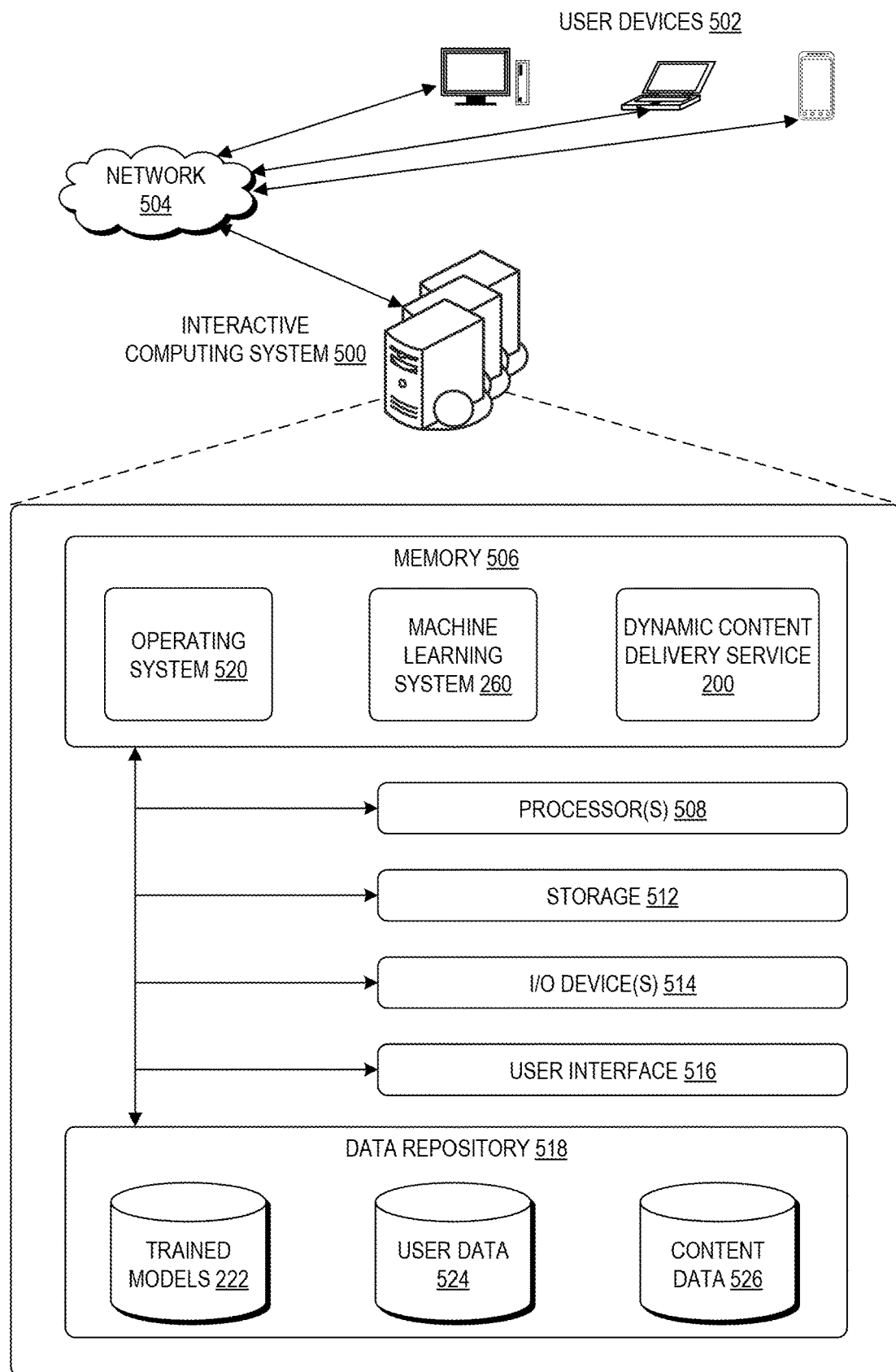
FIG. 5 is a block diagram of an illustrative computing system configured to implement the machine learning system and dynamic content delivery service of FIGS. 2A-2D.

FIG. 5 is a block diagram of an illustrative interactive computing system 500 configured to implement a content delivery service as described above. The architecture of the interactive computing system 500 may include a memory 506 storing an operating system 520, the machine learning system 260, and dynamic content delivery service 200, which can be in direct communication with one another or distributed among computing devices within a networked computing system and in communication with each other. Components used for the architecture may depend at least in part upon the type of network and/or environment selected.

The interactive computing system 500 may include one or more computers, perhaps arranged in a cluster of servers or as a server farm. The memory and processors that make up these computers may be located within one computer or distributed throughout many computers (including computers that are remote from one another) as detailed herein. These servers may be configured to serve content and manage recommendations. For example, the interactive computing system 500 may be configured to manage recommendations offered via a content delivery service 200 in connection with an electronic marketplace 510.

The interactive computing system 500 may include at least one memory 506 and one or more processing units (or processor(s)) 508. The memory 506 may include more than one memory and may be distributed throughout the interactive computing system 500. The memory 506 may store program instructions that are loadable and executable on the processor(s) 508 as well as data generated during the execution of these programs. Depending on the configuration and type of memory, the memory 506 may be volatile (such as random access memory (RAM)) and/or non-volatile (such as read-only memory (ROM), flash memory, or other memory). In some examples, the memory 506 may include multiple different types of memory, such as static random access memory (SRAM), dynamic random access memory (DRAM), or ROM. The memory can store the program instructions as a number of modules that configure processor(s) 508 to perform the various functions described herein, for example operating system 520, electronic catalog service 510, and dynamic content delivery service 200.

The memory 506 may include operating system 520 for interacting with the interactive computing system 500. Interactive computing system 500 can also host the machine learning system 260 and the dynamic content delivery service 200. In some embodiments, the machine learning system 260 and the dynamic content delivery service 200 may be implemented on geographically remote computing systems and communicate with one another over the network 504.

The processor 508 may include one or more general purpose computers, dedicated microprocessors, graphics processors, or other processing devices capable of communicating electronic information. Examples of the processor 508 include one or more application-specific integrated circuits (ASICs), graphical processing units (GPUs), field programmable gate arrays (FPGAs), digital signal processors (DSPs) and any other suitable specific or general purpose processors. The processor 508 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 506 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 500 may also include input/output (I/O) device(s) and/or ports 514, such as for enabling connection with a keyboard, a mouse, a pen, a voice input device, a touch input device, a display, speakers, a printer, or other I/O device.

The interactive computing system 500 may also include a user interface 516. The user interface 516 may be utilized by a user to access portions of the interactive computing system 500. In some examples, the user interface 516 may include a graphical user interface, web-based applications, programmatic interfaces such as application programming interfaces (APIs), or other user interface configurations. The user interface 516 can include displays of the recommendations described herein.

The interactive computing system 500 may also include a data store 518. In some examples, the data store 518 may include one or more data stores, databases, data structures, or the like for storing and/or retaining information associated with the interactive computing system 500. Thus, the data store 518 may include data structures, such as trained models data repository 522, user data repository 524, and content data repository 526. Trained models data repository 522 can store the parameters of machine learning models trained as described above with respect to FIG. 2A-FIG. 4. User data repository 524 can include user profiles data repository 205, user groupings data repository 225, and other user data repositories relating to users of the electronic catalog service. Content data repository 526 can include video profiles data repository 210 and available video channels data repository 240, as well as identified or predicted emotional reaction timelines for other types of content.

The interactive computing system 500 can communicate over network 504 with user devices 502. The network 504 can include any appropriate network, including an intranet, the Internet, a cellular network, a local area network or any other such network or combination thereof. For example, network 504 may be a publicly accessible network of linked networks, possibly operated by various distinct parties, such as the Internet. In other embodiments, the network 504 may include a private network, personal area network, local area network, wide area network, cable network, satellite network, cellular telephone network, etc. or a combination thereof, some or all of which may or may not have access to and/or from the Internet. User devices 502 can include any network-equipped computing device, for example desktop computers, laptops, smartphones, tablets, e-readers, gaming consoles, and the like. Users can access the interactive computing system 500 and interact with the dynamic content delivery service 200 via the network 504 and can be provided with content (including content recommended by machine learning system 260) via the network 504.

Terminology

Implementations disclosed herein provide systems, methods and apparatus for training and using machine learning models. The disclosed training and prediction models can be implemented in machine learning systems or artificial intelligence systems. As used herein, such systems include electronic memory storing computer-executable instructions for performing the described training and/or prediction operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A non-transitory computer storage medium storing executable code, wherein the executable code configures a computing system to perform a process comprising:
    for each video of a plurality of videos in a training data set:
        accessing a plurality of emotional reactions provided by a plurality of users at a plurality of timecodes of the video, wherein an emotional reaction provided by a first user at a timecode of the video represents emotion experienced by the first user when viewing video content at the timecode of the video,
        generating, based on machine learning analysis of the plurality of emotional reactions, a reaction timeline representing intensities and categories of emotional reactions elicited at the plurality of timecodes of the video, and
        identifying, based on content of the video, features of the video occurring at one or more of the plurality of timecodes, wherein the features of the video comprise visual features in image frames of the video or audio features of the video;
    for each video of the plurality of videos, training a machine learning model to predict emotional reactions elicited by features of the video by:
        providing the features of the video occurring at the one or more of the plurality of timecodes as input into the machine learning model,
        providing the reaction timeline as an expected output of the machine learning model based at least in part on the features of the video occurring at one or more of the plurality of timecodes, and
        training parameters of the machine learning model to predict the expected output from the input;
    upon completion of the training, storing the parameters of the machine learning model;
    receiving a new video not in the training data set;
    providing features of the new video as input to the machine learning model; and
    predicting, using the parameters of the machine learning model when provided with the features of the new video as input to the machine learning model, emotional reactions that will likely be experienced by a second user when the second user watches the new video as elicited by features of the new video, wherein the emotional reactions likely to be experienced by the second user are predicted by the machine learning model prior to the second user viewing the new video.

2. The non-transitory computer storage medium of claim 1, wherein the machine learning model comprises an artificial neural network, the non-transitory computer storage medium storing further executable code, wherein the further executable code configures the computing system to perform a further process comprising training the parameters using backpropagation.

3. The non-transitory computer storage medium of claim 1, wherein a machine learning system comprises the machine learning model and at least one additional machine learning model trained to identify features in video content, the non-transitory computer storage medium storing further executable code, wherein the further executable code configures the computing system to perform a further process comprising:
    identifying, based on providing content of the new video to the at least one additional machine learning model, a feature timeline representing occurrence of the features of the new video at one or more of a plurality of timecodes of the new video,
    wherein providing the features of the new video as input to the machine learning model comprises inputting the feature timeline of the new video into the machine learning model, and
    wherein predicting the emotional reactions elicited by the features of the new video comprises predicting, using the machine learning model, a reaction timeline representing occurrence of at least one category of emotional reaction at one or more of the plurality of timecodes of the new video.

4. The non-transitory computer storage medium of claim 3, the non-transitory computer storage medium storing further executable code, wherein the further executable code configures the computing system to perform a further process comprising:
    identifying a third user predicted to enjoy the new video based at least partly on the reaction timeline; and
    outputting the new video for presentation to the third user.

5. The non-transitory computer storage medium of claim 3,
the non-transitory computer storage medium storing further executable code, wherein the further executable code configures the computing system to perform a further process comprising outputting a graphical representation of the reaction timeline as feedback to a user interface for creating or editing the new video.

6. The non-transitory computer storage medium of claim 3, wherein the at least one additional machine learning model comprises a convolutional neural network trained to identify visual features in image frames of video content, the non-transitory computer storage medium storing further executable code, wherein the further executable code configures the computing system to perform a further process comprising:
inputting image frames of the new video into the convolutional neural network; and
using an output of the convolutional neural network to generate the feature timeline of the new video, wherein the feature timeline includes at least one visual feature occurring at one or more of the plurality of timecodes of the new video.

7. The non-transitory computer storage medium of claim 3, wherein the at least one additional machine learning model is trained to identify audio features in an audio waveform of video content, the non-transitory computer storage medium storing further executable code, wherein the further executable code configures the computing system to perform process comprising:
inputting an audio waveform of the new video into the at least one additional machine learning model; and
using an output of the at least one additional machine learning model to identify the feature timeline of the new video, wherein the feature timeline includes at least one audio feature occurring at one or more of the plurality of timecodes of the new video.

8. The non-transitory computer storage medium of claim 3, wherein the at least one additional machine learning model is trained to identify key words or phrases in a dialogue transcript of video content, the non-transitory computer storage medium storing further executable code, wherein the further executable code configures the computing system to perform a further process comprising:
inputting a dialogue transcript of the new video into the at least one additional machine learning model; and
using an output of the at least one additional machine learning model to identify the feature timeline of the new video, wherein the feature timeline includes at least one key word or phrase occurring at one or more of the plurality of timecodes of the new video.

9. A system comprising:
a computer-readable memory storing executable instructions; and
one or more computing devices in communication with the computer-readable memory, the one or more computing devices programmed by the executable instructions to at least:
for each video of a plurality of videos in a training data set:
access a plurality of emotional reactions provided by a plurality of users at a plurality of timecodes of the video,
generate, based on machine learning analysis of the plurality of emotional reactions, a reaction timeline representing intensities and categories of emotional reactions elicited at the plurality of timecodes of the video, and
identify, based on content of the video, features of the video occurring at one or more of the plurality of timecodes, wherein the features of the video comprise visual features in image frames of the video or audio features of the video;
for each video of the plurality of videos, train a machine learning model to predict emotional reactions elicited by features of the video, wherein to train the machine learning model to predict emotional reactions elicited by the features of the video, the one or more computing devices are further programmed by the executable instructions to at least:
provide the features of the video occurring at the one or more of the plurality of timecodes as input into the machine learning model,
provide the reaction timeline as an expected output of the machine learning model based at least in part on the features of the video occurring at one or more of the plurality of timecodes, and
train parameters of the machine learning model to predict the expected output from the input;
upon completion of the training, store the parameters of the machine learning model;
receive a new video not in the training data set;
provide features of the new video as input to the machine learning model; and
predict emotional reactions likely to be experienced by a first user when watching the new video as elicited by the features of the new video using the parameters of the machine learning model.

10. The system of claim 9, wherein the machine learning model comprises an artificial neural network, the computer-readable memory storing further executable instructions, wherein the one or more computing devices are further programmed to by the further executable instructions to at least train the parameters using backpropagation.

11. The system of claim 9, wherein a machine learning system comprises the machine learning model and at least one additional machine learning model trained to identify features in video content, the computer-readable memory storing further executable instructions, wherein the one or more computing devices are further programmed to by the further executable instructions to at least:
identify, based on providing content of the new video to the at least one additional machine learning model, a feature timeline representing occurrence of the features of the new video at one or more of a plurality of timecodes of the new video,
wherein to provide the features of the new video as input to the machine learning model, the one or more computing devices are further programmed to input the feature timeline of the new video into the machine learning model, and
wherein to predict the emotional reactions elicited by the features of the new video, the one or more computing devices are further programmed to predict, using the machine learning model, a reaction timeline representing occurrence of at least one category of emotional reaction at one or more of the plurality of timecodes of the new video.

12. The system of claim 11, the computer-readable memory storing further executable instructions, wherein the one or more computing devices are further programmed to by the further executable instructions to at least:

identify a second user predicted to enjoy the new video based at least partly on the reaction timeline; and output the new video for presentation to the second user.

13. The system of claim 11, the computer-readable memory storing further executable instructions, wherein the one or more computing devices are further programmed to by the further executable instructions to at least output a graphical representation of the reaction timeline as feedback to a user interface for creating or editing the new video.

14. The system of claim 11, wherein the at least one additional machine learning model comprises a convolutional neural network trained to identify visual features in image frames of video content, the computer-readable memory storing further executable instructions, wherein the one or more computing devices are further programmed to by the further executable instructions to at least:

input image frames of the new video into the convolutional neural network; and use an output of the convolutional neural network to identify the feature timeline of the new video, wherein the feature timeline includes at least one visual feature occurring at one or more of the plurality of timecodes of the new video.

15. The system of claim 11, wherein the at least one additional machine learning model is trained to identify audio features in an audio waveform of video content, the computer-readable memory storing further executable instructions, wherein the one or more computing devices are further programmed to by the further executable instructions to at least:

input an audio waveform of the new video into the at least one additional machine learning model; and use an output of the at least one additional machine learning model to identify the feature timeline of the new video, wherein the feature timeline includes at least one audio feature occurring at one or more of the plurality of timecodes of the new video.

16. A computer-implemented method comprising, as performed by at least one computing device configured to execute specific instructions:

for each video of a plurality of videos in a training data set:

accessing a plurality of emotional reactions provided by a plurality of users at a plurality of timecodes of the video, generating, based on machine learning analysis of the plurality of emotional reactions, a reaction timeline representing intensities and categories of emotional reactions elicited at the plurality of timecodes of the video, and identifying, based on content of the video, features of the video occurring at one or more of the plurality of timecodes, wherein the features of the video comprise visual features in image frames of the video or audio features of the video;

for each video of the plurality of videos, training a machine learning model to predict emotional reactions elicited by features of the video by:

providing the features of the video occurring at the one or more of the plurality of timecodes as input into the machine learning model, providing the reaction timeline as an expected output of the machine learning model based at least in part on the features of the video occurring at one or more of the plurality of timecodes, and training parameters of the machine learning model to predict the expected output from the input;

upon completion of the training, storing the parameters of the machine learning model;

receiving a new video not in the training data set;

providing features of the new video as input to the machine learning model; and predicting emotional reactions likely to be experienced by a first user when watching the new video as elicited by the features of the new video using the parameters of the machine learning model.

17. The computer-implemented method of claim 16, wherein a machine learning system comprises the machine learning model and at least one additional machine learning model trained to identify features in video content, the computer-implemented method further comprising:

identifying, based on providing content of the new video to the at least one additional machine learning model, a feature timeline representing occurrence of the features of the new video at one or more of a plurality of timecodes of the new video, wherein providing features of the new video as input to the machine learning model comprises inputting the feature timeline of the new video into the machine learning model, and wherein predicting emotional reactions elicited by the features of the new video comprises predicting, using the machine learning model, a reaction timeline representing occurrence of at least one category of emotional reaction at one or more of the plurality of timecodes of the new video.

18. The computer-implemented method of claim 17, wherein the at least one additional machine learning model comprises a convolutional neural network trained to identify visual features in image frames of video content, the computer-implemented method further comprising:

inputting image frames of the new video into the convolutional neural network; and using an output of the convolutional neural network to identify the feature timeline of the new video, wherein the feature timeline includes at least one visual feature occurring at one or more of the plurality of timecodes of the new video.

19. The computer-implemented method of claim 16 further comprising:

determining a second user predicted to enjoy the new video based at least partly on output of the machine learning model; and outputting the new video for presentation to the second user.

20. The computer-implemented method of claim 16, wherein predicting the emotional reactions likely to be experienced by the first user when watching the new video comprises predicting, prior to the first user watching the new video, the emotional reactions likely to be experienced by the first user when watching the new video.

* * * * *